United States Patent
Liu et al.

(10) Patent No.: US 8,711,585 B2
(45) Date of Patent: Apr. 29, 2014

(54) HIGH-FREQUENCY-LINK POWER-CONVERSION SYSTEM HAVING DIRECT DOUBLE-FREQUENCY RIPPLE CURRENT CONTROL AND METHOD OF USE

(71) Applicant: The Florida State University Research Foundation, Inc., Tallahassee, FL (US)

(72) Inventors: Xiaohu Liu, Tallahassee, FL (US); Hui Li, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 0 days.

(21) Appl. No.: 14/018,988

(22) Filed: Sep. 5, 2013

(65) Prior Publication Data

US 2014/0063874 A1    Mar. 6, 2014

Related U.S. Application Data

(60) Provisional application No. 61/696,829, filed on Sep. 5, 2012.

(51) Int. Cl.
*H02M 1/12*        (2006.01)
(52) U.S. Cl.
USPC .......................................................... 363/40
(58) Field of Classification Search
USPC .................................... 363/39, 40, 41, 43
See application file for complete search history.

(56) References Cited

U.S. PATENT DOCUMENTS

| | | | |
|---|---|---|---|
| 6,654,261 B2* | 11/2003 | Welches et al. | 363/41 |
| 2005/0207190 A1* | 9/2005 | Gritter | 363/40 |
| 2008/0205096 A1* | 8/2008 | Lai et al. | 363/40 |

* cited by examiner

*Primary Examiner* — Adolf Berhane
*Assistant Examiner* — Jye-June Lee
(74) *Attorney, Agent, or Firm* — Molly Sauter; Smith & Hopen, P.A.

(57) ABSTRACT

A direct double-frequency ripple current control in a two-stage high-frequency-link (HFL) based fuel cell converter that can achieve low-frequency ripple free input current without using large electrolytic capacitors is provided. To eliminate the double-frequency ripple current disturbance introduced by the single-phase inverter load, a proportional-resonant (PR) controller is developed to achieve an extra high control gain at designed resonant frequency. This high gain can be viewed as the virtual high impedance for blocking the double-frequency ripple energy propagation from inverter load to fuel cell stack. More particularly, the proposed control system can realize the utilization of all capacitive ripple energy sources in the system by regulating all the capacitors to have large voltage swing and the voltage swing is synchronized to keep real-time balancing of the transformer primary-side and secondary-side voltages. As a result, the zero-voltage-switching (ZVS) operation for all switching devices in the dc-dc stage can be guaranteed.

20 Claims, 20 Drawing Sheets

HIGH-FREQUENCY-LINK POWER-CONVERSION SYSTEM HAVING DIRECT DOUBLE-FREQUENCY RIPPLE CURRENT CONTROL AND METHOD OF USE

CROSS-REFERENCE TO RELATED APPLICATIONS

This application claims priority to U.S. Provisional Patent Application No. 61/696,829 filed on Sep. 5, 2012, entitled, "A Single-Phase Fuel Cell Power Conditioning System with Minimized DC Capacitor".

BACKGROUND OF THE INVENTION

Fuel cell systems are emerging as a promising energy source for mobile and power generation applications due to their high efficiency, high reliability and low emissions of regulated pollutants. Fuel cell systems require an electrical isolation between the low-voltage output of the fuel cell stack and the high-voltage dc bus for protection. High-frequency-link (HFL) power converters are therefore being widely applied in fuel cell systems because they provide high-frequency galvanic isolation and provide a large reduction in the size and weight of the isolation transformer.

One of the key issues in fuel cell systems is that the fuel cell current low-frequency ripple exhibits a hysteresis behavior and results a thermal issue among the fuel cell stacks. A straight-forward solution is to incorporate a bulky electrolytic capacitor as the energy buffer to reduce the ripple current. However, the use of an electrolytic capacitor will decrease the system lifetime as well as increase the system volume and cost. Therefore, being able to suppress the low-frequency ripple without using electrolytic capacitors is crucial to the future of fuel cell systems.

Accordingly, what is needed in the art is a current-fed, three-phase, high-frequency-link fuel cell having a reduced low-frequency ripple current that does not require the use of electrolytic capacitors. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a fuel cell power conditioning system that can eliminate double-frequency ripple is now met by a new, useful, and nonobvious invention.

In accordance with an embodiment of the present invention, a method for reducing a double-frequency ripple current disturbance introduced by an inverter load coupled to a fuel cell system is provided. The method includes, generating, by a first proportional-resonant controller, an output having a double-frequency component of a phase shift angle between the active switches on a low voltage side (LVS) and a high voltage side (HVS) of the fuel cell system, generating, by a proportional-integral controller, an output having a dc component and a double-frequency component of the phase shift angle between the active switches on the low voltage side (LVS) and the high voltage side (HVS) of the fuel cell system and offsetting the double-frequency component generated by the first proportional-integral controller with the double-frequency component generated by the proportional-resonant controller to reduce a double-frequency ripple current disturbance introduced when an inverter load is coupled to the fuel cell system.

In accordance with an additional embodiment of the present invention, a system for reducing a double-frequency ripple current disturbance introduced by an inverter load coupled to a fuel cell system is provided. The system comprises, a first proportional-resonant controller configured for generating an output having a double-frequency component of a phase shift angle between the active switches on a low voltage side (LVS) and a high voltage side (HVS) of the fuel cell system, a proportional-integral controller configured for generating an output having a dc component and a double-frequency component of the phase shift angle between the active switches on the low voltage side (LVS) and the high voltage side (HVS) of the fuel cell system and circuitry for offsetting the double-frequency component generated by the first with the double-frequency component generated by the proportional-resonant controller to reduce a double-frequency ripple current disturbance introduced when an inverter load is coupled to the fuel cell system.

In accordance with the present invention, a direct double-frequency ripple current control in a two-stage high-frequency-link (HFL) based fuel cell converter that can achieve low-frequency ripple free input current without using large electrolytic capacitors is provided. To eliminate the double-frequency ripple current disturbance introduced by the single-phase inverter load, a proportional-resonant (PR) controller is developed to achieve an extra high control gain at designed resonant frequency. This high gain can be viewed as the virtual high impedance for blocking the double-frequency ripple energy propagation from inverter load to fuel cell stack. More particularly, the proposed control system can realize the utilization of all capacitive ripple energy sources in the system by regulating all the capacitors to have large voltage swing and the voltage swing is synchronized to keep real-time balancing of the transformer primary-side and secondary-side voltages. As a result, the zero-voltage-switching (ZVS) operation for all switching devices in the dc-dc stage can be guaranteed.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In fuel cell high-power applications, research has been focused on the three-phase dc-dc converter based power conditioning system because it offers better performance over its single-phase counterpart in terms of higher power density, lower switching device current stress, smaller size of passive components and other benefits. While, three-phase dc-dc converter may be either current-fed or voltage-fed, the current-fed topology is better suited to low-voltage high-current fuel cell applications where a high voltage step-up ratio is required. Moreover, the current-fed topology benefits from the ability to directly and precisely control the input current to the converter.

The present invention is based upon a three-phase current-fed interleaved-structure HFL fuel cell system. Compared to other three-phase dc-dc converter based fuel cell systems, the present invention provides several advantages, including a direct double-frequency ripple current control based on the current-fed three-phase HFL converter to achieve the low-frequency ripple-free input current, that is accomplished without adding any extra circuit components. The proposed direct double-frequency ripple current controller of the present invention allows for the substitution of the bulky electrolytic capacitor with a small film capacitor. Additionally, the control system of the present invention can realize the full utilization of the capacitive ripple energy sources in the proposed fuel cell system which provides a further reduction in the dc-bus capacitance. Furthermore, the zero-voltage-switching (ZVS) operation of all switching devices in the dc-dc stage can still be maintained without adding any extra circuits.

Figure 1:
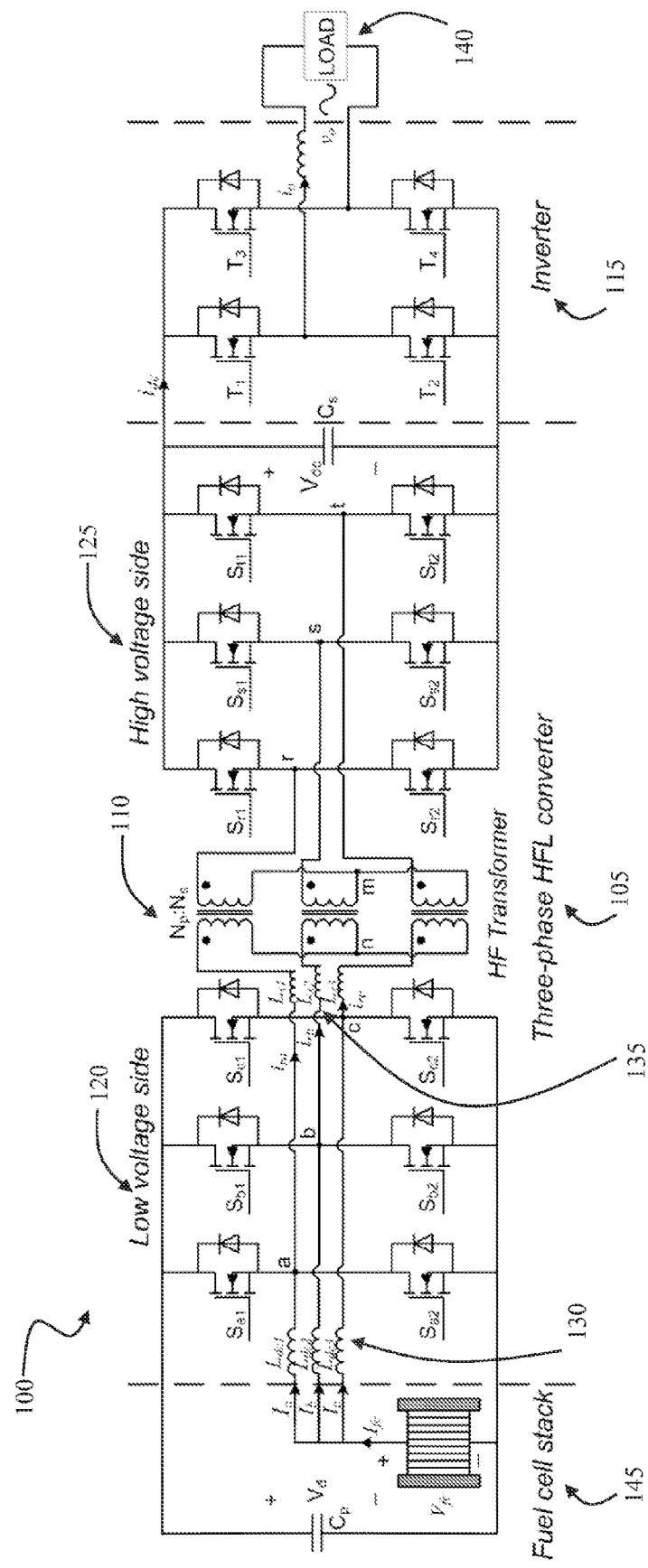
FIG. 1 is an illustration of a two-stage high frequency-link (HFL) based high power fuel cell conditioning system in accordance with an embodiment of the invention.

FIG. 1 illustrates the proposed two-stage high-frequency-link based high power fuel cell system 100. The system 100 consists of a current-fed three-phase HFL converter 105 with isolated Y-Y connected high-frequency (HF) transformer 110 and an inverter 115. The three-phase HFL converter 105 power flow is controlled by the phase shift angle φ between the active switches on low voltage side (LVS) 120 and high voltage side (HVS) 125. The converter 105 can be operated either in the boost mode or in the buck mode. The converter is operated in boost mode for fuel cell applications. The boost function is achieved by the dc inductors ($L_{dc1}$, $L_{dc2}$ and $L_{dc3}$) 130 and three half bridges on LVS. The leakage inductors inductors ($L_{s1}$, $L_{s2}$ and $L_{s3}$) 135 are the energy transfer element for each phase.

The major features of the three-phase HFL converter 105 of the present invention include: 1) increased converter power rating by paralleling phases, not by paralleling multiple devices; 2) reduced size of input dc inductors and dc-bus capacitor with interleaving structure; 3) maintained soft switching operation and high efficiency without any extra circuit components. While the above features have been previously developed, a method to reduce the input double-frequency ripple current caused by the inverter load has not been proposed. As such, the present invention reduces the direct double-frequency ripple current control of a three-phase HFL converter when connecting a single-phase inverter load.

Figure 2:
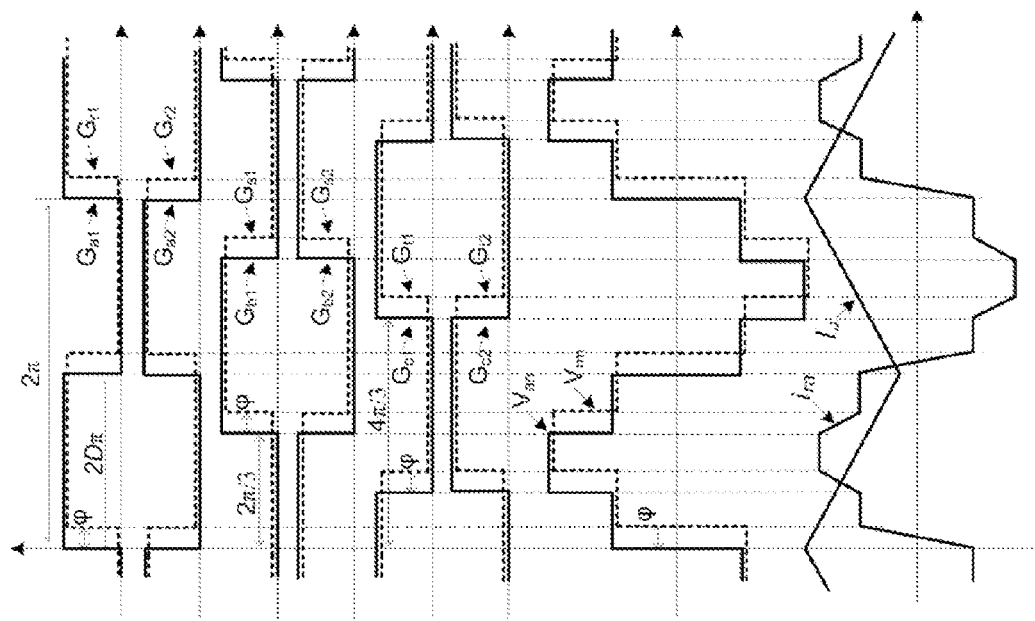
FIG. 2 is graphical representation of idealized three-phase HFL converter key operation waveforms in accordance with an embodiment of the invention.

FIG. 2 shows the idealized three-phase HFL converter key operation waveforms. $G_x$ is the gating signal of switch $S_x$ shown in FIG. 1 accordingly. As shown in FIG. 2, the gate signals for upper and lower switches on each phase are complementary, with the phase angle 2π/3 between phase legs on one side. Benefiting from current-fed topology, the duty cycle D is controllable. Therefore, the LVS dc bus voltage can be controlled in a way to always maintain the soft-switching operation. A transformer current and dc inductor current, $V_{an}$ and $V_{rm}$ are the phase A transformer primary-side and secondary-side voltages, respectively.

Figure 3:
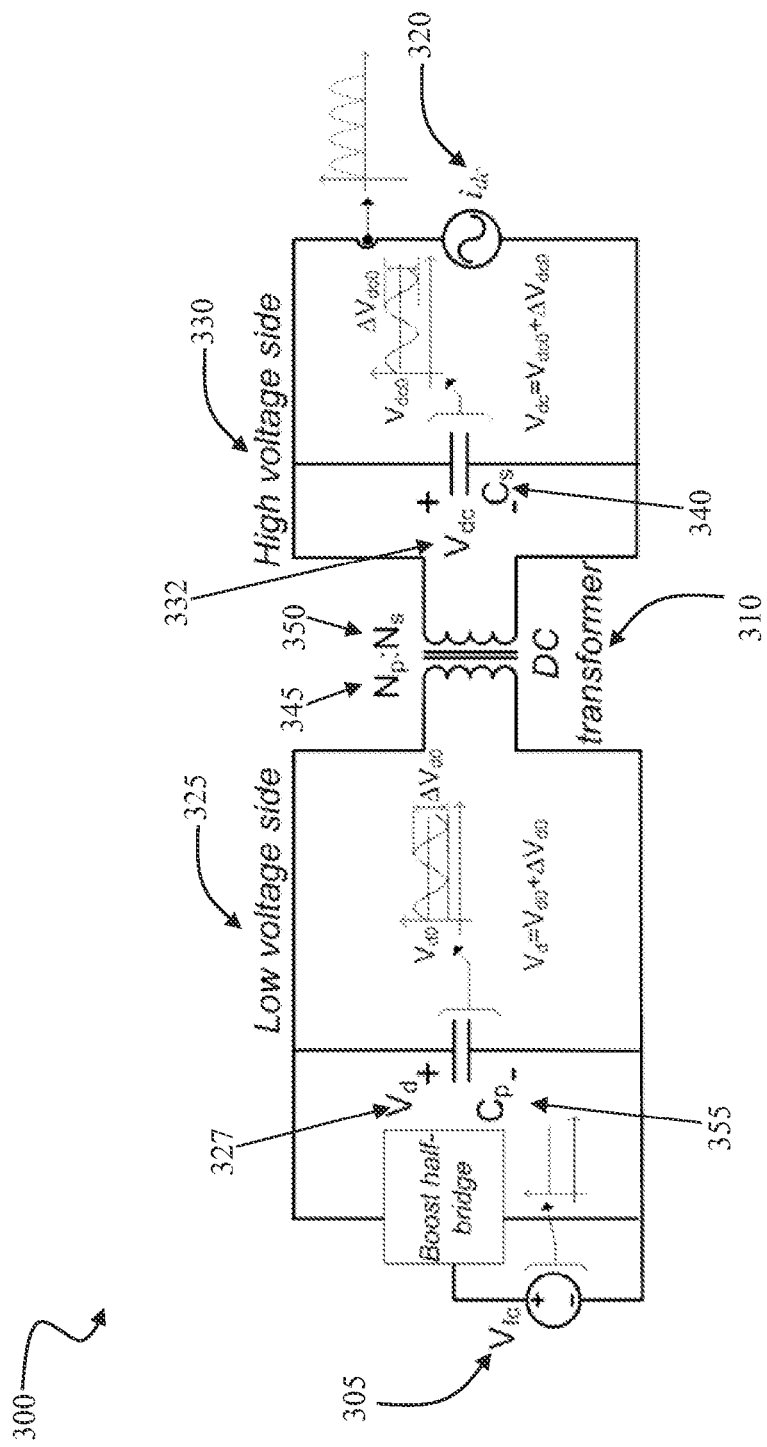
FIG. 3 is an illustration of an equivalent ripple circuit model of a proposed fuel cell system in accordance with an embodiment of the invention.

FIG. 3 shows the equivalent ripple circuit model of the proposed fuel cell system 300. $V_{fc}$ 305 is the fuel cell stack voltage. If the fuel cell current has negligible low-frequency ripple current, $V_{fc}$ 305 is a constant voltage. The dc-dc converter can be simplified as an ideal dc transformer since its switching frequency is much larger than the system ripple frequency. The inverter load is modeled by a double-frequency pulsation current source $i_{dc}$ 320. As shown, both the LVS 325 dc-bus voltage $V_d$ 327 and the HVS 330 dc-bus voltage $V_{dc}$ 332 have a relatively large voltage swing. As such, the large voltage variation of $V_{dc}$ 332 leads to small HVS dc bus capacitor $C_s$ 340 which makes it viable to replace the electrolytic capacitor with a film capacitor. Additionally, if real-time balancing of transformer primary-side 345 voltage and secondary-side 350 voltage can be maintained by synchronizing the LVS dc-bus voltage $V_d$ 327 with primary-referred HVS dc-bus voltage $V_{dc}$ 332, the three-phase HFL converter can always maintain the ZVS operation. In addition, voltage variation on both the LVS and HVS dc buses make both the primary-side 345 and secondary-side 350 capacitive energy sources ($C_p$ 355 and $C_s$ 340 as shown in the circuit of FIG. 3) to provide the ripple energy required by the inverter load. The circuit ripple energy balancing shown in FIG. 3 can be expressed as:

$$C_p V_{d0} \Delta V_d + C_s V_{dc0} \Delta V_{dc} = \frac{P_{load}}{\omega_{load}}$$

where $V_{d0}$ and $\Delta V_{d0}$ are the LVS dc-bus average voltage and voltage variation (peak-to-peak), respectively. $V_{dc0}$ and $\Delta V_{dc0}$ are the HVS dc-bus average voltage and voltage variation (peak-to-peak), respectively. $P_{load}$ is the load real power, $\omega_{load}$ is the load angular frequency.

As illustrated in the above equation for the circuit ripple energy balancing, the proposed fuel cell system can make full untilization of the system capacitive ripple energy. This is a unique advantage compared to the voltage-fed fuel cell converter. Since the voltage-fed fuel cell system connects the LVS dc-bus capacitor $C_p$ directly to the fuel cell stack. Therefore, the capacitive ripple energy of $C_p$ is not able to be utilized.

The proposed direct double-frequency ripple current control system diagram is described with reference to FIG. 4. The proposed control system 400 includes duty cycle control and phase shift control. In the duty cycle $D=D_0+D_r$ 405 as illustrated, the dc component of the duty cycle ($D_0$) 415 is set to be 0.5. This is because the three-phase HFL converter 420 has the optimized operation efficiency at 50% duty cycle. Next, the ripple component of the duty cycle ($D_r$) 410 is generated by synchronizing the LVS dc-bus voltage $V_d$ 420 with the primary-referred HVS dc-bus voltage $V_{dc}$ 425. The purpose is to real-time balance the transformer primary-side and secondary-side voltage in order to ensure the ZVS operation of all the three-phase HFL converter switching devices. A proportional-resonant (PR) controller 430 is used for $G_{Dr}(s)$ to regulate the swing of the LVS dc-bus voltage, $V_d$ 420.

Figure 4:
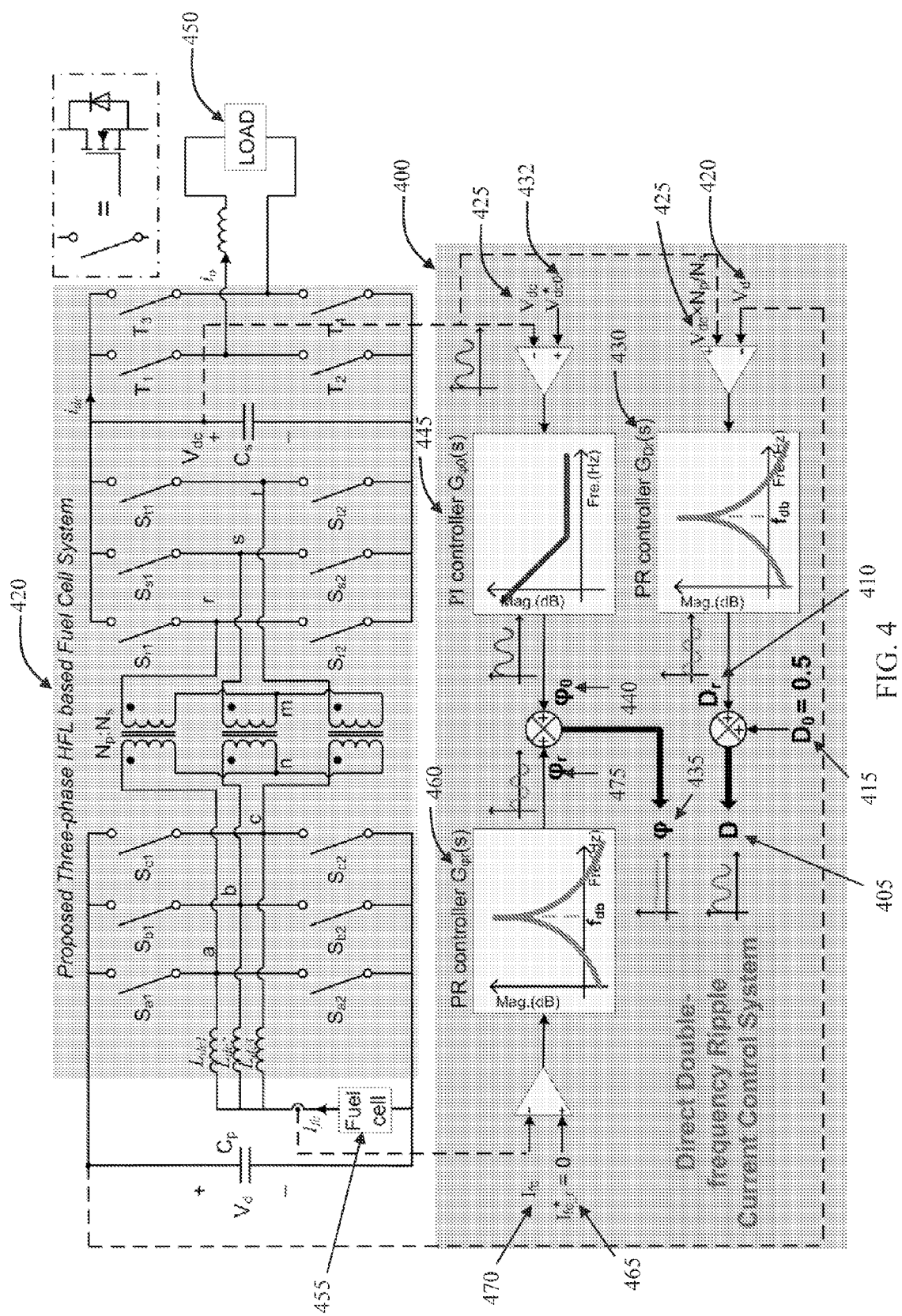
FIG. 4 is an illustration of a proposed direct-double ripple current control system in accordance with an embodiment of the invention.

As shown in FIG. 4, the real-time primary-referred $V_{dc}$ 425 is employed as the voltage reference. $V_d=V_{fc}/D$ due to the LVS half bridge boost function. $V_{fc}$ is a constant value if $I_{fc}$ 470 has no low-frequency ripple. Therefore, the duty cycle (D) will contain a double-frequency ripple in order to keep $V_d$ 420 synchronized with primary-referred $V_{dc}$ 425 which has the double-frequency variation.

In deriving the phase shift angle $\phi=\phi_0+\phi_r$ 435, the dc component of $\phi(\phi_0)$ 440 is generated by regulating $V_{dc0}$ to meet the inverter modulation requirement so the inverter can generate the required ac voltage. A proportional-integral (PI) controller 445 $G_{\phi 0}(s)$ is adopted to regulate $V_{dc0}$. The voltage reference $V^*_{dc0}$ 432 is a constant dc value. The feedback $V_{dc}$ 425 consists of a constant dc value $V_{dc0}$ and a double-frequency ripple $\Delta V_{dc}$. The control objective of $G_{\phi 0}(s)$ is only to regulate the dc component of $V_{dc}$ to follow $V^*_{dc0}$. Therefore, a PI controller 445 can be selected. Due to the relatively large $\Delta V_{dc}$ in the feedback, the double-frequency component will be generated in the PI controller 445 output, $\phi_0$ 440, and this double-frequency component will be reflected on the fuel cell current if the inverter load ripple energy is propagated into the fuel cell stack 455 through the HFL converter.

In order to block the ripple energy propagation from the inverter load 450 to the fuel cell stack 455, a direct double-frequency ripple current controller $G_{\phi r}(s)$ is developed. The PR controller 460 is employed for $G_{\phi r}(s)$ since the PR controller can generate an extra high control gain at its resonant frequency. This high gain can be viewed as the virtual high impedance for blocking the ripple energy. As illustrated, the current reference $I^*_{fc\_r}$ 465 is 0. The real-time $I_{fc}$ 470 which consists of a dc component and a double-frequency ripple is used directly for feedback because the controller $G_{\phi r}(s)$ is designed to be immune to the dc component and only responds to the double-frequency ripple component of the fuel cell current. As a result, $\phi_r$ 475, the output of $G_{\phi r}(s)$, is a double-frequency component.

The inverter control of the load adopts the traditional single-phase dual-loop d-q vector control. However, since $V_{dc}$ has the relatively large double-frequency ripple, the inverter control needs to feedback the real-time $V_{dc}$ for PWM modulation.

The basic principle of ZVS operation is to gate on the incoming device while the anti-parallel diode is conducting. To analyze the ZVS conditions, the variable d is defined as:

$$d = \frac{N_p V_{dc}}{N_s V_d}$$

Where $N_p$ and $N_s$ are the transformer primary-side and secondary-side turns ratio, respectively. $V_d$ and $V_{dc}$ are the LVS and HSV dc-bus voltage, respectively.

"d=1" means that $V_d$ matches with primary-referred $V_{dc}$. If d=1, the ZVS conditions are always satisfied for HVS switches and LVS upper switches ($S_{a1}$, $S_{b1}$, $S_{c1}$ as shown in the circuit of FIG. 4). For LVS lower switches ($S_{a2}$, $S_{b2}$, $S_{c2}$ as shown in the circuit of FIG. 4) ZVS conditions, the ratio of dc inductor divided by leakage inductor is another key factor. Small ratio leads to large inductor current ripple which results in large soft switching operation region for LVS lower switches. However, the large current ripple leads to large inductor core loss and conduction loss. It is therefore a trade-off design. In an exemplary embodiment, this ratio is selected to be 13.3. Due to the converter symmetric property, each phase switches on the same position have the same ZVS conditions. The soft switching conditions for phase A LVS and HVS switches are:

$$\begin{cases} S_{a1}: & d > \frac{8\pi^2 + 9\pi^2/(L_{dc}/L_s)}{4(7\pi\varphi - 2\pi^2 - 3\varphi^2)} \\ S_{a2}: & d < \frac{8\pi^2 + 9\pi^2/(L_{dc}/L_s)}{4(\pi\varphi + 2\pi^2 - 3\varphi^2)} \\ S_{r1}: & d > \frac{2\pi}{2\pi - 3\varphi} \\ S_{r2}: & d > \frac{2\pi}{2\pi - 3\varphi} \end{cases}$$

The three-phase HFL output power and 1 p.u. base power are:

$$P_o = \frac{dV_d^2 \varphi (4\pi - 3\varphi)}{6\pi \omega L_s} \quad 5$$

and, 1 p.u. base power:

$$P_{o\_base} = \frac{V_d^2}{\omega L_s} \quad 10$$

Where $P_o$ is the three-phase HFL converter output power. $\phi$ is the phase shift angle. $\omega$ is the switching angular frequency. $L_s$ is the leakage inductor.

Figure 5:
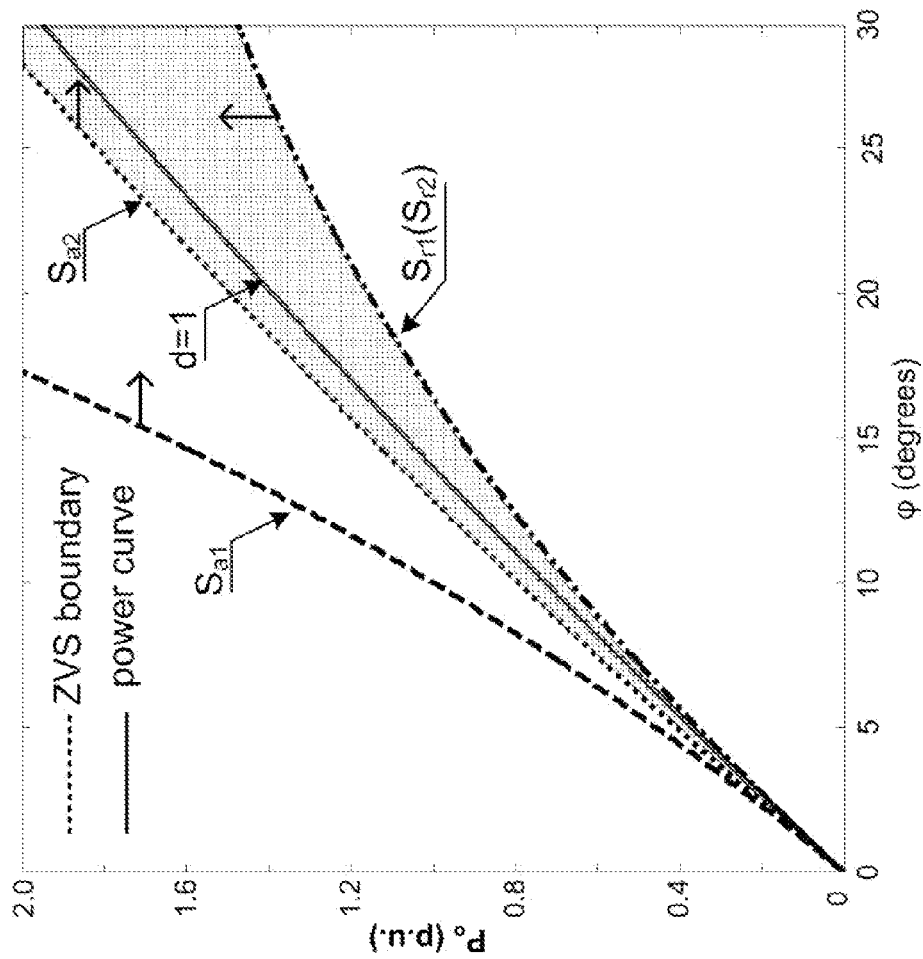
FIG. 5 is a graphical representation of scaled power curves and ZVS boundaries of $S_{a1}$, $S_{a2}$, $S_{r1}$ and $S_{r2}$ at D=0.5 with $L_{dc1}/L_{s1}$=13.3 in accordance with an embodiment of the invention.

Based on the above equations, the scaled power curves and ZVS boundaries of phase A switches at D=0.5 with $L_{dc1}/L_{s1}$=13.3 are shown in FIG. 5. As illustrated, the shaded area is the soft switching region. If "d=1" control can be achieved, the operation can be always maintained within the soft switching region. This explains why $V_d$ is real-time synchronized with primary-referred $V_{dc}$ in the proposed control system.

In order to design the controller $G_{\phi r}(s)$, $G_{\phi o}(s)$ and $G_{Dr}(s)$, the three-phase HFL converter small-signal model needs to be studied. The average model of the studied three-phase converter has been previously developed. Due to the symmetric property, the modeling of three-phase HFL converter can be treated as the model of single-phase half-bridge converter. The phase A is selected to illustrate the average model wherein ($i_a$, $v_d$, $v_{dc}$) are chosen as state variables, ($v_{in}$, D, $\phi$, $i_{dc}$) are chosen as control inputs and ($i_a$, $v_{dc}$) are chosen as controlled output, the average model state equation can be given as follows:

$$\begin{cases} L_{dc1} \frac{di_a}{dt} = v_{in} - Dv_d \\ C_p \frac{dv_d}{dt} = Di_a - \frac{V_{dc}\varphi(4\pi - 3\varphi)}{18\pi\omega L_{s1}} \\ C_s \frac{dv_{dc}}{dt} = -i_{dc} + \frac{V_d\varphi(4\pi - 3\varphi)}{18\pi\omega L_{s1}} \end{cases} \quad 40$$

However, the small-signal model with respect to the inverter load current disturbance has not been previously studied. Therefore, the small-signal model considering the inverter load current disturbance is given below. By introducing the small perturbations around the nominal operation point in the model previously developed, the small signal model of phase A half-bridge converter can be developed as follows:

$$\begin{cases} L_{dc1} \frac{d\tilde{i}_a}{dt} = \tilde{v}_{in} - D\tilde{v}_d - V_d \tilde{D} \\ C_p \frac{d\tilde{v}_d}{dt} = D\tilde{i}_a + I_a \tilde{D} - \frac{\phi(4\pi - 3\phi)}{18\pi\omega L_{s1}} \tilde{v}_{dc} - \frac{V_{dc}(4\pi - 6\phi)}{18\pi\omega L_{s1}} \tilde{\varphi} \\ C_s \frac{d\tilde{v}_{dc}}{dt} = -\tilde{i}_{dc} + \frac{\phi(4\pi - 3\phi)}{18\pi\omega L_{s1}} \tilde{v}_d + \frac{V_d(4\pi - 6\phi)}{18\pi\omega L_{s1}} \tilde{\varphi} \end{cases} \quad 60$$

where $i_{dc}$ is the inverter double-frequency pulsation current as shown in the circuit of FIG. 4. Therefore, the state-space equations can be expressed as follows:

$$\begin{cases} \begin{bmatrix} \dot{\tilde{i}}_a \\ \dot{\tilde{v}}_d \\ \dot{\tilde{v}}_{dc} \end{bmatrix} = \begin{bmatrix} 0 & -\frac{D}{L_{dc1}} & 0 \\ \frac{D}{C_p} & 0 & -\frac{\phi(4\pi - 3\phi)}{con1} \\ 0 & \frac{\phi(4\pi - 3\phi)}{con2} & 0 \end{bmatrix} \cdot \begin{bmatrix} \tilde{i}_a \\ \tilde{v}_d \\ \tilde{v}_{dc} \end{bmatrix} + \\ \begin{bmatrix} \frac{1}{L_{dc1}} & 0 & \frac{-V_d}{L_{dc1}} & 0 \\ 0 & \frac{-V_{dc}(4\pi - 6\phi)}{con1} & \frac{I_a}{C_p} & 0 \\ 0 & \frac{V_d(4\pi - 6\phi)}{con2} & 0 & \frac{-1}{C_s} \end{bmatrix} \cdot \begin{bmatrix} \tilde{v}_{in} \\ \tilde{\varphi} \\ \tilde{D} \\ \tilde{i}_{dc} \end{bmatrix} \\ \tilde{v}_{dc} = [0 \ 0 \ 1] \cdot [\tilde{i}_a \ \tilde{v}_d \ \tilde{v}_{dc}]^T \\ \tilde{i}_a = [1 \ 0 \ 0] \cdot [\tilde{i}_a \ \tilde{v}_d \ \tilde{v}_{dc}]^T \end{cases}$$

$$\begin{cases} \dot{\tilde{x}} = A\tilde{x} + B\tilde{u} \\ y = C\tilde{x}, \end{cases} \quad A = \begin{bmatrix} 0 & -\frac{D}{L_{dc1}} & 0 \\ \frac{D}{C_p} & 0 & -\frac{\phi(4\pi - 3\phi)}{con1} \\ 0 & \frac{\phi(4\pi - 3\phi)}{con2} & 0 \end{bmatrix},$$

$$B = \begin{bmatrix} \frac{1}{L_{dc1}} & 0 & \frac{-V_d}{L_{dc1}} & 0 \\ 0 & \frac{-V_{dc}(4\pi - 6\phi)}{con1} & \frac{I_a}{C_p} & 0 \\ 0 & \frac{V_d(4\pi - 6\phi)}{con2} & 0 & \frac{-1}{C_s} \end{bmatrix}$$

$$\begin{cases} y_1 = \tilde{i}_a, C_1 = [1 \ 0 \ 0] \\ y_2 = \tilde{v}_d, C_2 = [0 \ 1 \ 0] \\ y_3 = \tilde{v}_{dc}, C_3 = [0 \ 0 \ 1] \end{cases}$$

where con1=$18\pi\omega L_{s1}C_p$, con2=$18\pi\omega L_{s1}C_s$.

Based on the small-signal model shown in the equations above, the transfer function matrix from input factors to the input current can be obtained as:

$$\tilde{i}_a(s) = C_1(sI-A)^{-1}B\tilde{u}(s) = G_{iv}(s)\tilde{v}_{in}(s) + G_{i\phi}(s)\tilde{\phi}(s) + G_{iD}(s)\tilde{D}(s) + G_{io}(s)\tilde{i}_{dc}(s)$$

The inverter load current disturbance to input current transfer function $G_{io}(s)$, the control-to-input current transfer function $G_{i\phi}(s)$ and the duty cycle disturbance to input current transfer function $G_{iD}(s)$ can be calculated as:

$$G_{io}(s) = \frac{\tilde{i}_a(s)}{\tilde{i}_{dc}(s)} \Bigg|_{\substack{\tilde{v}_{in}(s)=0 \\ \tilde{\phi}(s)=0 \\ \tilde{D}(s)=0}} =$$

$$\frac{-D\phi(4\pi - 3\phi)}{sL_{dc1}C_s con1(s^2 + \phi(4\pi - 3\phi)^2/(con1 con2) + D^2/(C_p L_{dc1}))}$$

$$G_{i\varphi}(s) = \frac{\tilde{i}_a(s)}{\tilde{\phi}(s)} \Bigg|_{\substack{\tilde{v}_{in}(s)=0 \\ \tilde{D}(s)=0 \\ \tilde{i}_{dc}(s)=0}} =$$

-continued $$\frac{C_p D(sV_{dc}(4\pi - 6\phi)con2 + V_d\phi(4\pi - 3\phi)(4\pi - 6\phi))}{s(s^2 C_p L_{dc1} con1 con2 + C_p L_{dc1} \phi(4\pi - 3\phi)^2 + D^2 con1 con2)}$$

$$G_{iD}(s) = \frac{\tilde{i}_a(s)}{\tilde{D}(s)}\bigg|_{\substack{\tilde{v}_{in}(s)=0 \\ \tilde{\phi}(s)=0 \\ \tilde{i}_{dc}(s)=0}} =$$

$$\frac{-(s^2 C_p V_d con1 con2 + sDI_a con1 con2 + C_p V_d \phi(4\pi - 3\phi)^2)}{s(s^2 C_p L_{dc1} con1 con2 + C_p L_{dc1} \phi(4\pi - 3\phi)^2 + D^2 con1 con2)}$$

FIG. 6 shows the open-loop $G_{io}(s)$ and $G_{iD}(s)$ bode diagram based on the above equations with different values of Cs. The circuit parameter values of the equations are: $L_{dc1}$=14.6 µH, $L_{s1}$=1.1 µH, $C_p$=220 µF, $f_s$=40 kHz. The nominal operation point is $\phi$=0.056π, $V_d$=20V, $V_{dc}$=200V, $I_a$=16 A. The low-frequency component of $i_{dc}$ is only the 120 Hz ripple current since the inverter outputs 60 Hz ac voltage. Therefore, the 120 Hz response of $G_{io}(s)$ is highlighted.

Figure 6A:
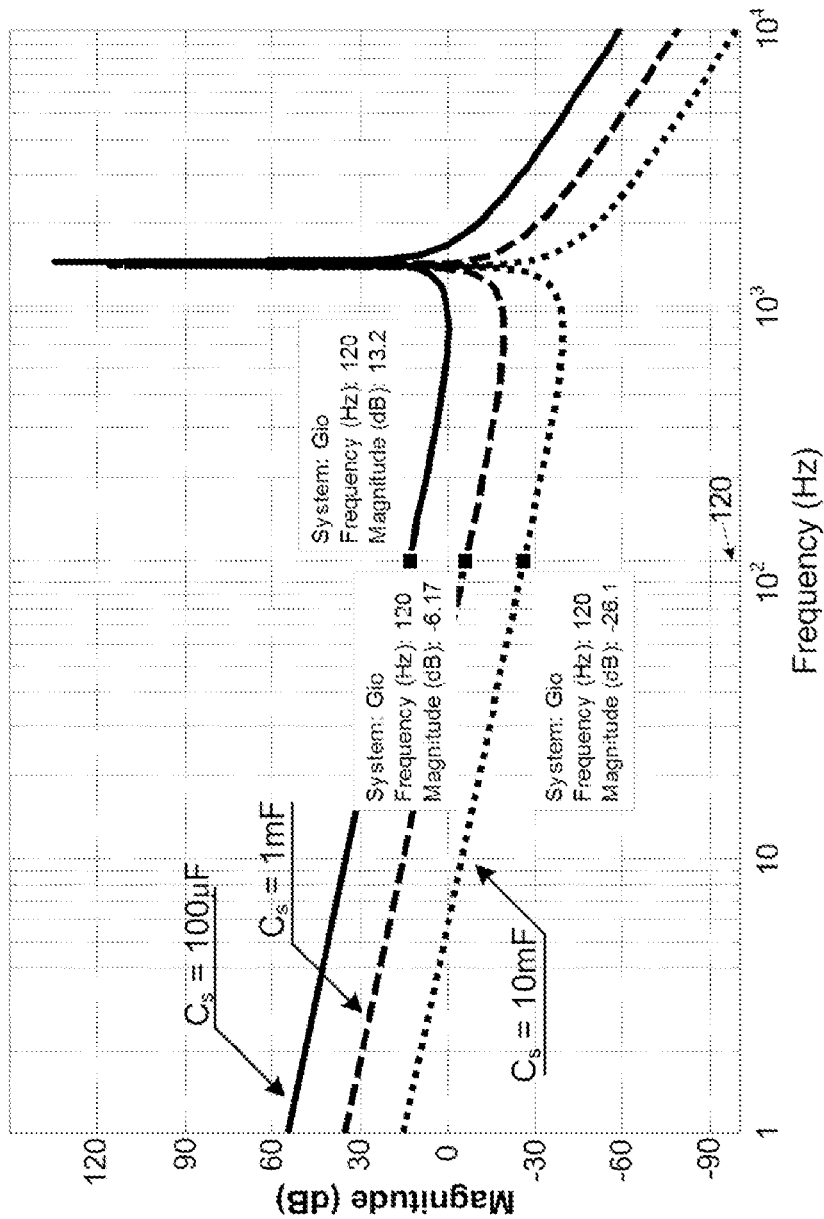
FIG. 6A is a graphical representation of an open-loop transfer function bode diagram with different values of $C_s$: $G_{io}(s)$ in accordance with an embodiment of the invention.

As shown in FIG. 6A, the response is 13.2 dB with $C_s$=100 µF which means the input current 120 Hz ripple magnitude is 4.57 times of $i_{dc}$ magnitude. The response with $C_s$=10 mF is only −26.1 dB which means the input current 120 Hz ripple magnitude is only 0.05 times of $i_{dc}$ magnitude. This explains why the large dc capacitor is able to suppress the input current double-frequency ripple.

Figure 6B:
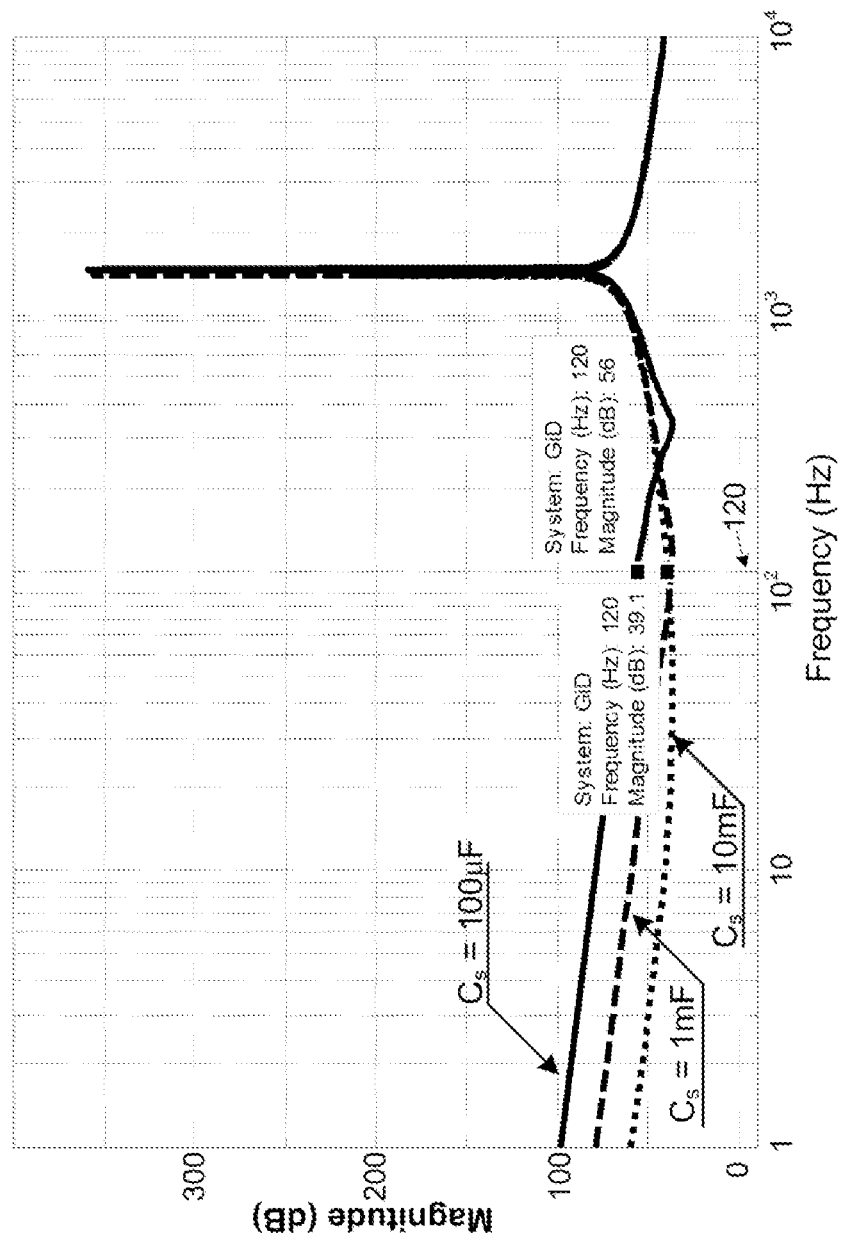
FIG. 6B is a graphical representation of an open-loop transfer function bode diagram with different values of $C_s$: $G_{iD}(s)$ in accordance with an embodiment of the invention.

Since the duty cycle D also has the double-frequency ripple as explained in subsection A, its disturbance to the input current also needs to be studied. As shown in FIG. 6B, the input current always has a relatively large response to the duty cycle disturbance regardless of large $C_s$ value. The response is 39.1 dB with $C_s$=10 mF which means the input current 120 Hz ripple magnitude is 98.86 times of D ripple magnitude. Therefore, this disturbance has to be mitigated if implementing the proposed "d=1" varied duty cycle control.

Figure 7:
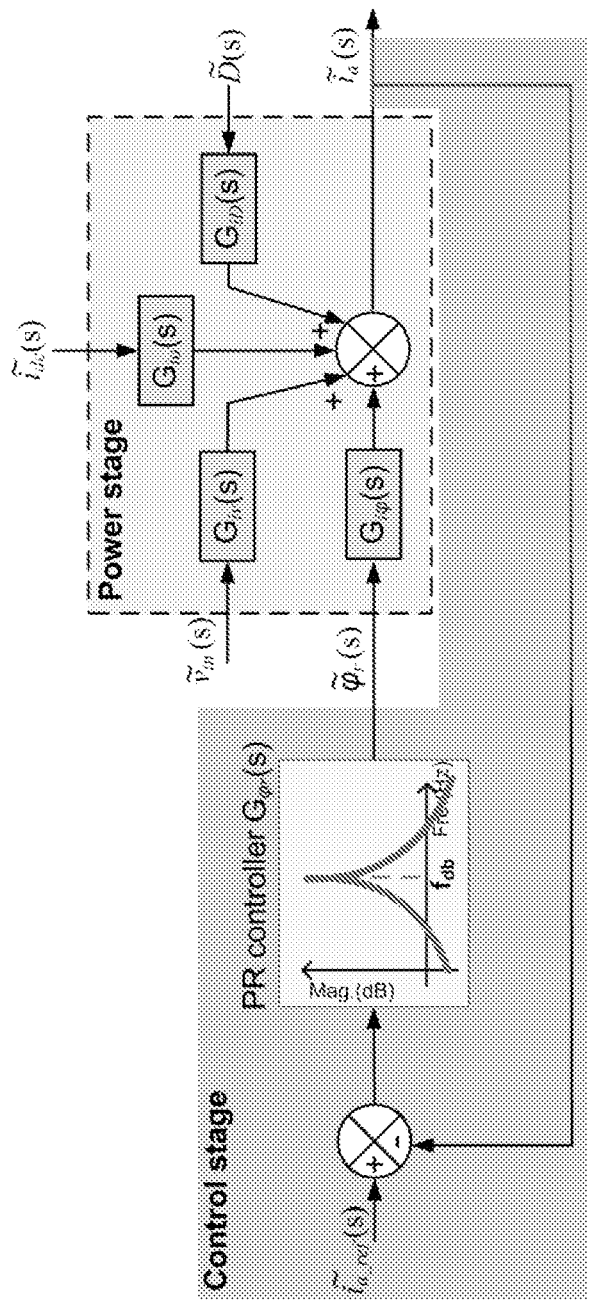
FIG. 7 is illustration of a phase A input current small-signal model block diagram in accordance with an embodiment of the invention.

Based on the developed small-signal model, the phase A input current small-signal model block diagram is illustrated in FIG. 7. Therefore, the closed-loop inverter load disturbance and duty cycle disturbance to the fuel cell current transfer function can be obtained and given as:

$$\frac{G_{io}(s)}{1 + T_r(s)} = \frac{\tilde{i}_a(s)}{\tilde{i}_{dc}(s)}\bigg|_{\substack{i_{a\_ref}(s)=0 \\ \tilde{v}_{in}(s)=0 \\ D(s)=0}} = \frac{G_{io}(s)}{1 + G_{\phi r}(s)G_{i\phi}(s)}$$

$$\frac{G_{iD}(s)}{1 + T_r(s)} = \frac{\tilde{i}_a(s)}{\tilde{D}(s)}\bigg|_{\substack{i_{a\_ref}(s)=0 \\ \tilde{v}_{in}(s)=0 \\ \tilde{i}_{dc}(s)=0}} = \frac{G_{iD}(s)}{1 + G_{\phi r}(s)G_{i\phi}(s)}$$

As shown, the compensated system has the loop gain 1/(1+ $T_r(s)$). This loop gain response at 120 Hz is found to be very small if the proposed controller $G_{\phi r}(s)$ is designed to have a relatively large response at 120 Hz. As a result, the fuel cell current response to inverter load disturbance and duty cycle disturbance can be both minimized since the low-frequency component of both disturbances only consists of 120 Hz component. The PR controller is therefore selected because it can be designed to have an extra high gain only at its resonant frequency. And this resonant frequency is set to be 120 Hz for the proposed technology.

Figure 8:
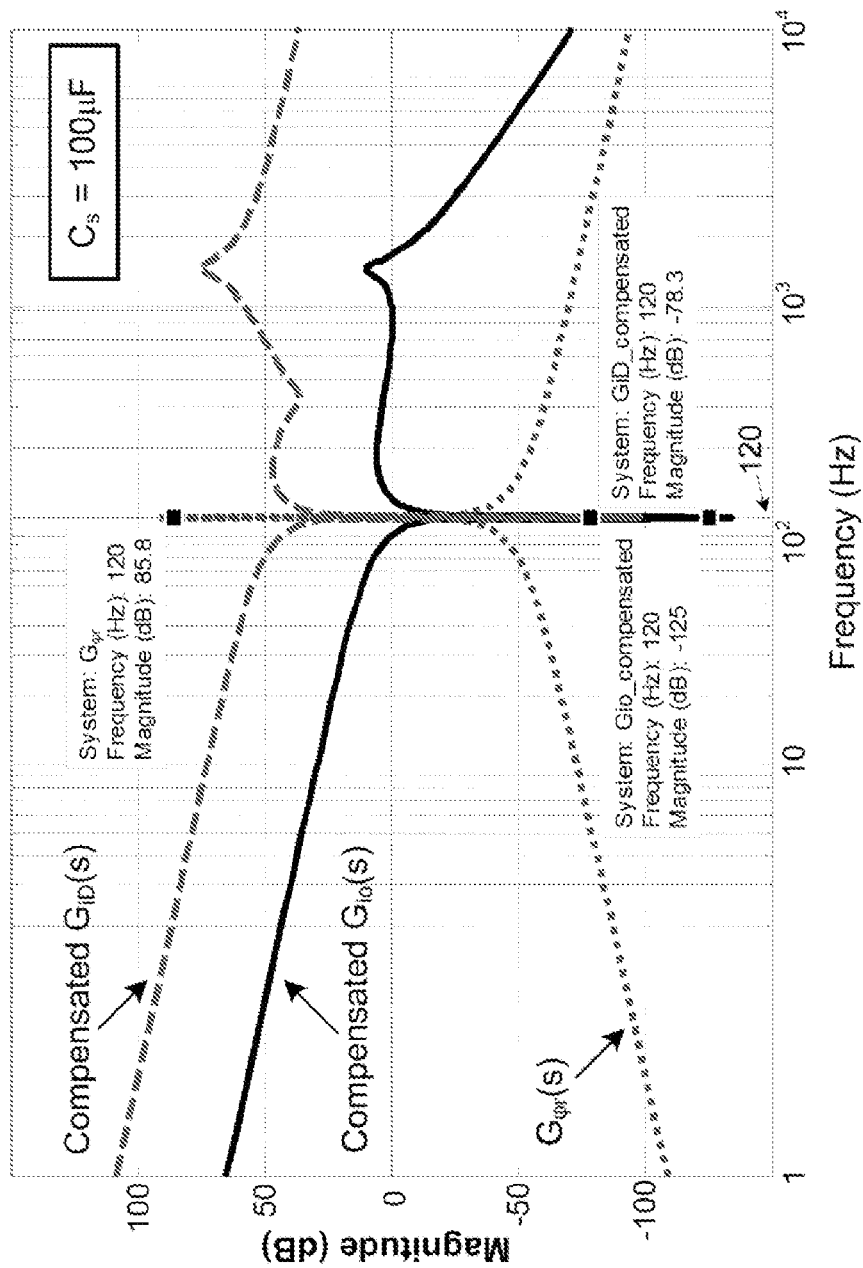
FIG. 8 is a graphical representation of bode diagrams of PR controller $G_{\phi r}(s)$, compensated $G_{io}(s)$ and $G_{iD}(s)$ with $C_s=100$ μF in accordance with an embodiment of the invention.

The PR controller $G_{\phi r}(s)$ can be expressed by $K_p s/(s^2 + (2\pi f_r)^2)$ where $f_r$=120. The principle of choosing $K_p$ is to ensure that $G_{\phi r}(s)$ has negligible dc component response and relatively large resonant frequency response. It is a trade-off design. FIG. 8 shows the bode diagrams of PR controller $G_{\phi r}(s)$, compensated $G_{io}(s)$ and $G_{iD}(s)$ with $C_s$=100 µF. $K_p$ is selected to be 0.2. This value is appropriate since the 120 Hz disturbance response is 85.8 dB and dc component response is smaller than −100 dB as illustrated in FIG. 8. As a result, the real-time $I_{fc}$ can be directly used for feedback with respect to the zero reference since its dc component response is negligible. The compensated $G_{io}(s)$ and $G_{iD}(s)$ response to 120 Hz disturbance is −125 dB and −78.3 dB, respectively. Therefore, the compensated system can theoretically eliminate the fuel cell double-frequency ripple current caused by the inverter load current and duty cycle.

Based on the small-signal model shown in, the transfer function matrix from input factors to the output voltage $V_{dc}$ is given as:

$$\tilde{v}_{dc}(s) = C_3(sI-A)^{-1}B\tilde{u}(s) = G_{vv2}(s)\tilde{v}_{in}(s) + G_{v\phi 2}(s)\tilde{\phi}(s) + G_{vD2}(s)\tilde{D}(s) + G_{vo2}(s)\tilde{i}_{dc}(s)$$

In order to design the controller $G_{\phi 0}(s)$, control-to-output transfer function $G_{v\phi 2}(s)$ is calculated and shown as:

$$G_{v\phi 2}(s) = \frac{(4\pi - 6\phi)(s^2 C_p V_d L_{dc1} con1 - sC_p V_{dc} L_{dc1} \phi(4\pi - 3\phi) + V_d\phi D^2 con1)}{s(s^2 C_p L_{dc1} con1 con2 + C_p L_{dc1} \phi(4\pi - 3\phi)^2 + D^2 con1 con2)}$$

Based on the developed small-signal model, as shown in the above equation, it has a pair of conjugated right half plane zeros. Therefore, the system stability criterion is that the phase margin $\Phi_m$=180°−2×180°+∠$G_{v\phi 2}(j2\pi f_c)$>0, where fc is the cross-over frequency.

Figure 9:
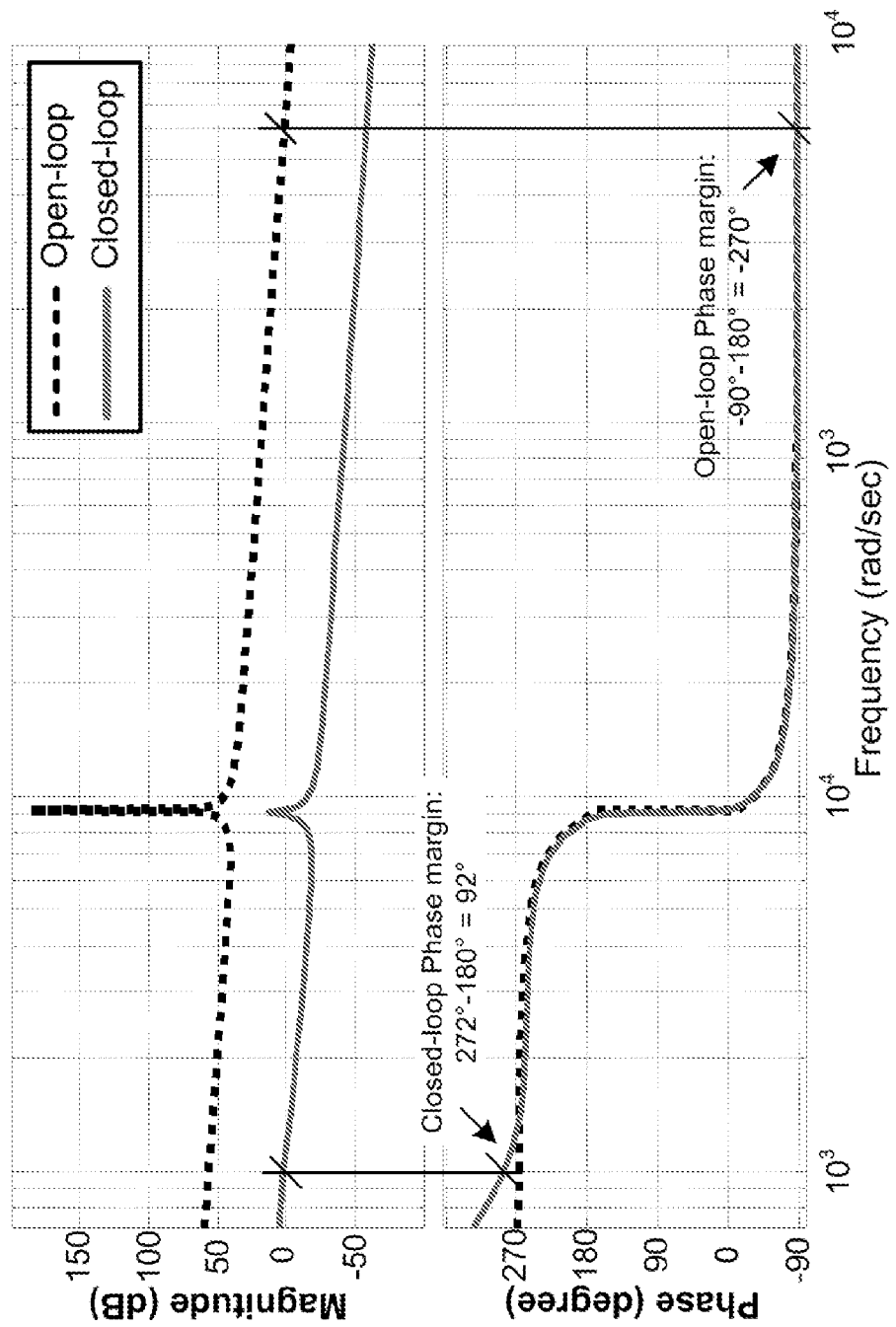
FIG. 9 is a graphical representation of bode diagrams of open-loop and closed-loop $G_{v\phi 2}(s)$ with $C_s=100$ μF in accordance with an embodiment of the invention.

FIG. 9 shows the $G_{v\phi 2}(s)$ bode diagrams of open-loop and closed-loop with $C_s$=100 µF. The parameters of the equation for $G_{v\phi 2}(s)$ are the same as those used in the equation for calculating $G_{io}(s)$. As shown, the system open-loop phase margin $\Phi_m$=−270°<0. Therefore, the stability of open-loop system is theoretically very poor. However, it is known that all the lossy components add more inertia to the system so the real converter is actually more stable. The design principle of $G_{\phi 0}(s)$ is to ensure the system stability. As shown in FIG. 9 where $G_{\phi 0}(s)$=(1+0.001×s)/s, the compensated system phase margin $\phi_m$=92°>0. Therefore, the compensated system is more stable.

The design procedure of controller $G_{Dr}(s)$ is very similar to the design of $G_{\phi r}(s)$. The $G_{Dr}(s)$ design principle is to ensure that $V_d$ has a relatively large response at 120 Hz so it can be synchronized with primary-referred $V_d$ to maintain d=1. In addition, the disturbance caused by the phase shift angle $\phi$ and inverter load $i_{dc}$ should be mitigated.

The transfer function matrix from input factors to the output voltage $V_d$ is given as:

$$\tilde{v}_d(s) = C_2(sI-A)^{-1}B\tilde{u}(s) = G_{vv1}(s)\tilde{v}_{in}(s) + G_{v\phi 1}(s)\tilde{\phi}(s) + G_{vD1}(s)\tilde{D}(s) + G_{vo1}(s)\tilde{i}_{dc}(s)$$

The key transfer functions are given as:

$$G_{v\phi1}(s) = \frac{-C_p L_{dc1}(4\pi - 6\phi)(sV_{dc}con2 + V_d\phi(4\pi - 3\phi))}{s^2 C_p L_{dc1} con1 con2 + C_p L_{dc1}\phi(4\pi - 3\phi)^2 + D^2 con1 con2}$$

$$G_{vD1}(s) = \frac{con1 con2(sI_a L_{dc1} - DV_d)}{s^2 C_p L_{dc1} con1 con2 + C_p L_{dc1}\phi(4\pi - 3\phi)^2 + D^2 con1 con2}$$

$$G_{vo1}(s) = \frac{L_{dc1}\phi(4\pi - 3\phi)con2 C_p/C_s}{s^2 C_p L_{dc1} con1 con2 + C_p L_{dc1}\phi(4\pi - 3\phi)^2 + D^2 con1 con2}$$

Figure 10:
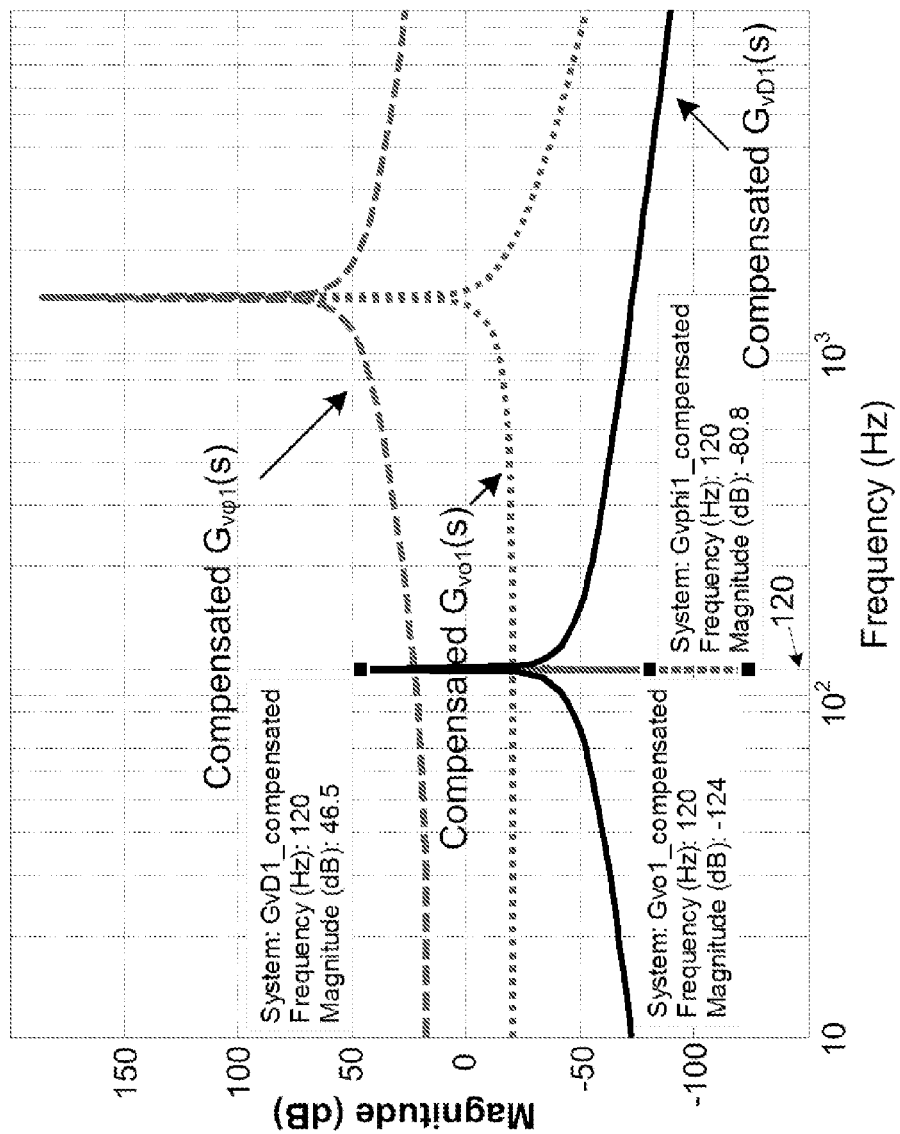
FIG. 10 is a graphical representation of Bode diagrams of compensated Gvφ1(s), Gvo1(s) and GvD1(s) with Cs=100 μF in accordance with an embodiment of the invention.

The compensated $G_{v\phi1}(s)$, $G_{vo1}(s)$ and $G_{vD1}(s)$ bode diagram is illustrated in FIG. 10, with $G_{Dr}(s)=0.01$ s/(s$^2$+ (2π·120)$^2$). As illustrated in FIG. 10, $V_d$ response at 120 Hz is 46.5 dB and its response to inverter load and phase shift angle disturbance are −124 dB and −80.8 dB, respectively. Therefore, the compensated system can theoretically maintain "d=1" control and eliminate the inverter load current and phase shift angle disturbance.

The experiments were conducted in the laboratory to verify the aforementioned theoretical analysis and the proposed direct double-frequency ripple current control performance. A 3.5 kW fuel cell system test bed was developed for the experiments. The DC inductors and transformers designs in the test bed adopt the planar cores with coils encapsulated within multilayer printed circuit board (PCB). Both the LVS and HVS dc bus capacitor adopts the Epcos film capacitor as the energy buffer. The dc voltage source was used to emulate the steady state characteristic of the fuel cell module. The three-phase HFL converter based fuel cell system test bed key circuit parameters are listed in Table 1. The digital control board employs DSP TMS320F28335.

Table I. The three-phase HFL converter based fuel cell system test bed key circuit parameters

| Three-phase HFL converter | | | | H-bridge inverter | |
|---|---|---|---|---|---|
| Leakage inductor (µH) | Phase A: 1.10/Phase B: 1.10/Phase C: 1.11 | DC inductor (µH) | Phase A: 14.64/Phase B: 14.65/Phase C: 14.72 | L filter inductor (mH) | 2.0 |
| Transformer magnetizing inductor (mH) | Phase A: 0.11/Phase B: 0.09/Phase C: 0.12 | Transformer turns ratio | 4:16 | Mosfets | Cree SiC CMF20120D |
| Primary-side Mosfets | IXFN320N17T2 | Secondary-side Mosfets | Cree SiC CMF20120D | Anti-parallel Diode | Cree SiC C3D10060A |
| Primary-side film capacitor | Epcos 110 µF/450 V × 2 | Secondary-side film capacitor | Epcos 60 µF/800 V × 3 | Load | 16.1 Ω |
| Switching frequency | | | 40 kHz | Switching frequency | 20 kHz |

Figure 11:
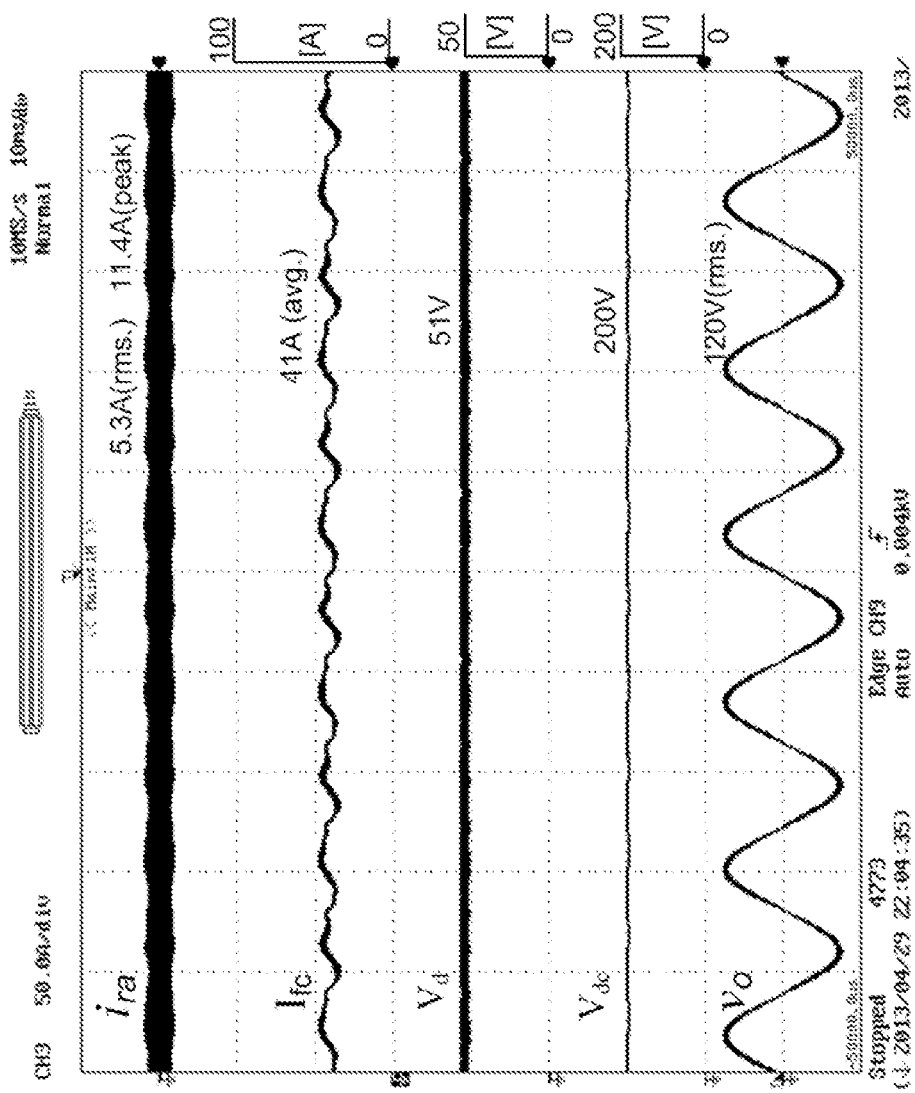
FIG. 11 is a graphical representation of experimental results without proposed control method, $C_p=220$ μF, $C_s=3.18$ mF in accordance with an embodiment of the invention.

FIG. 11-FIG. 13 illustrate the experimental results with and without proposed direct double-frequency ripple current control method. $i_{ra}$, $I_{fc}$, $V_d$, $V_{dc}$, $V_o$ represent the phase A secondary-side transformer current, fuel cell current, LVS dc bus voltage, HVS dc bus voltage and inverter output voltage, respectively. Since the proposed fuel cell system has the high-frequency transformer, the synchronized soft start-up scheme is adopted to achieve the minimized transformer current response during the start-up transient.

FIG. 11 shows the baseline case I experimental results without the proposed method. In order to suppress the fuel cell current double-frequency ripple, the large electrolytic capacitors are connected to the HVS dc-bus. The adopted capacitors for this case are: $C_p=220$ µF, $C_s=3.18$ mF. As shown, $V_d=51V$, $V_{dc}=200V$ and they both have relatively very small ripple due to the relatively large capacitor. $i_{ra\_rms}=5.3$ A and $i_{ra\_peak}=11.4$ A. $v_o=120$ V (rms.). $I_{fc}$ average value is around 41 A.

Figure 12A:
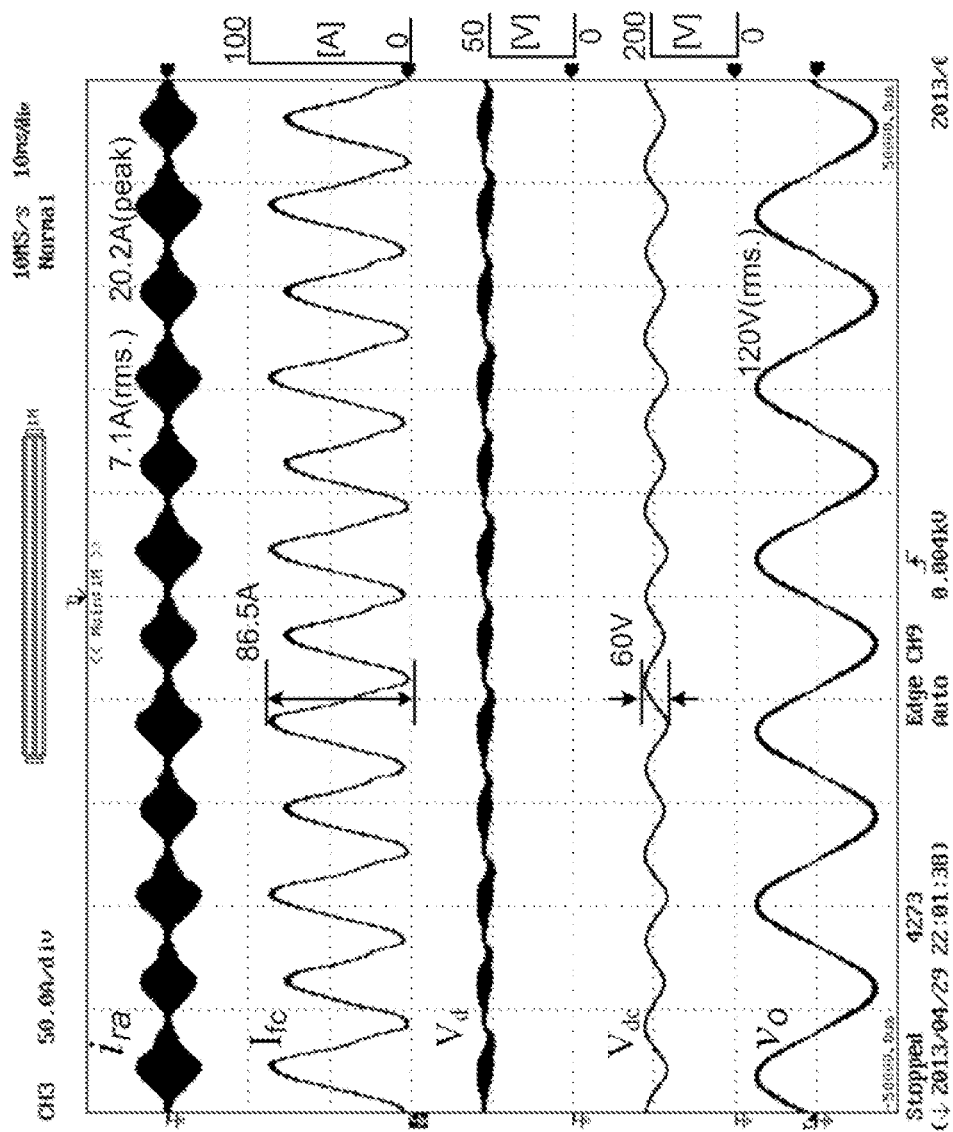
FIG. 12A is a graphical representation of experimental results without proposed control method, Cp=220 μF, Cs=180 μF illustrating system performance in accordance with an embodiment of the invention.
Figure 12B:
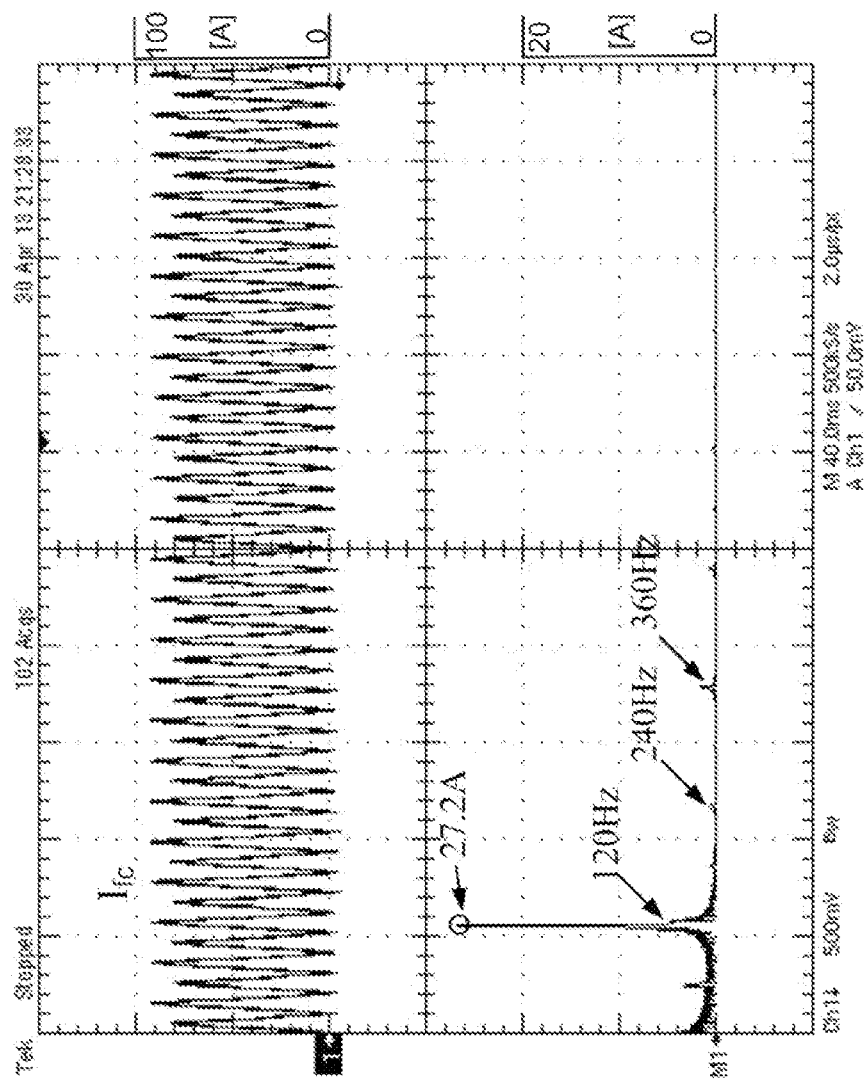
FIG. 12B is a graphical representation of experimental results without proposed control method, Cp=220 μF, Cs=180 μF illustrating $I_{fc}$ FFT analysis result in accordance with an embodiment of the invention.

FIG. 12 shows the baseline case II experimental results without the proposed method. The adopted capacitors for this case are: $C_p=220$ µF, $C_s=180$ µF. As shown in FIG. 12A, $I_{fc}$ contains the relatively large 120 Hz ripple current due to the relatively small capacitor. $\Delta I_{fc}$ (peak-to-peak)=86.5 A. $\Delta V_{dc}=60V$, $v_o=120$ V (rms.). $i_{ra\_rms}=7.1$ A and $i_{r\_peak}=20.2$ A. The transformer current has much larger rms. and peak values compared to FIG. 11 since the double-frequency ripple current is propagated into the fuel cell stack through the transformer. FIG. 12B shows the FFT analysis result of $I_{fc}$ in FIG. 12A. As illustrated, the 120 Hz component is 27.2 A which is 27.2/41=66.3% of the dc component. It further validates that $I_{fc}$ has the relatively large double-frequency component.

Figure 13A:
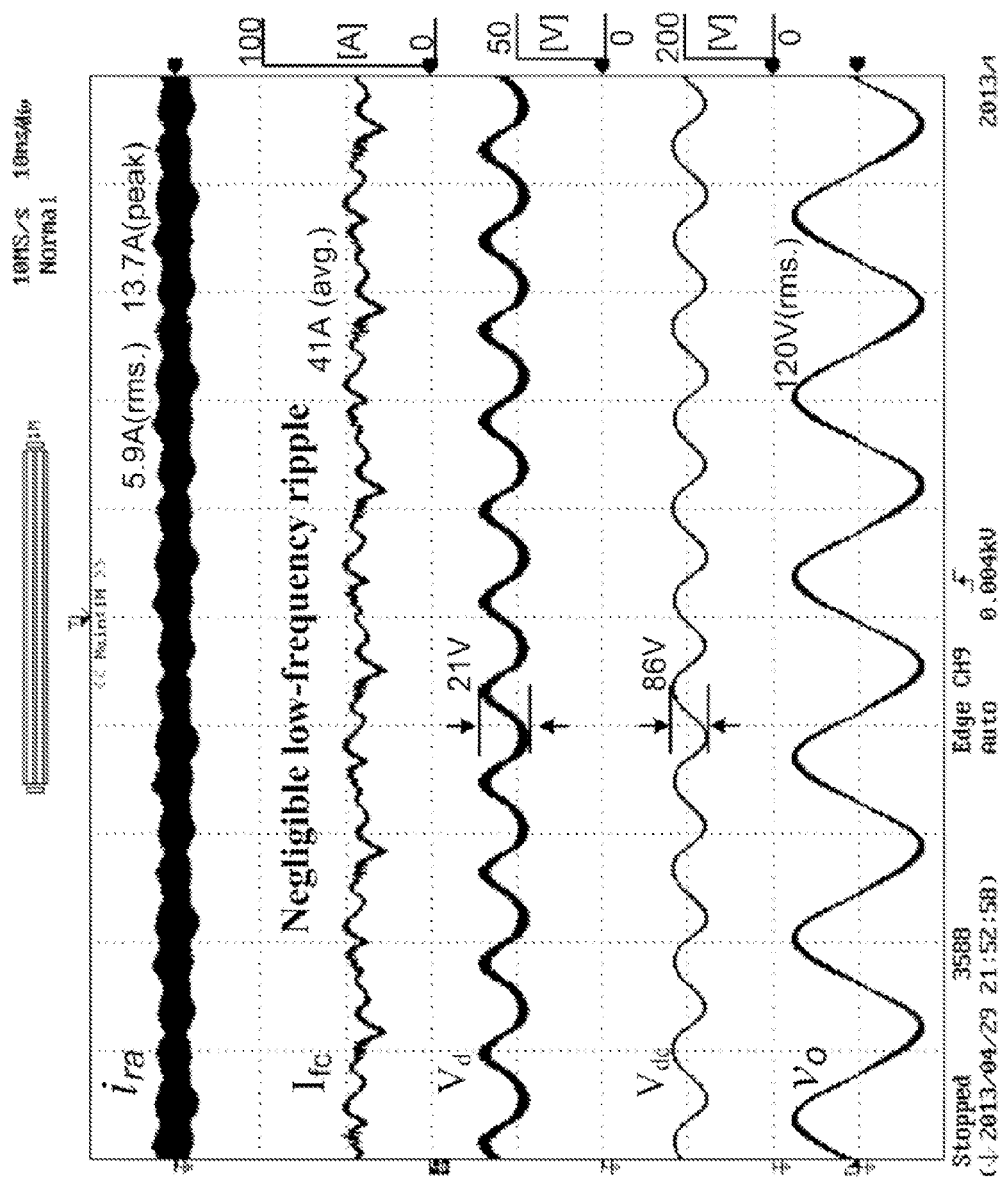
FIG. 13A is a graphical representation of experimental results with proposed control method, Cp=220 μF, Cs=180 μF illustrating system performance in accordance with an embodiment of the invention.

FIG. 13 shows the experimental results with the proposed method. The adopted capacitor for this case are: $C_p=220$ µF, $C_s=180$ µF. As shown in FIG. 13A, $I_{fc}$ has the negligible low-frequency ripple. Therefore, it proves that the proposed method can almost eliminate the fuel cell double-frequency ripple with relatively small film capacitor. $v_o=120V$ (rms.). $\Delta V_{dc}=86V$, $\Delta V_d=21V$. As shown, the LVS dc-bus voltage $V_d$ has been synchronized with $V_{dc}$. And the voltage swing ratio $\Delta V_{dc}/\Delta V_d=4.095$ which is very close to the transformer turns ratio 4.0. The proposed varied duty cycle control with "d=1" is therefore validated. In addition, the result shown in FIG. 13A also demonstrates that the proposed direct-ripple current control and "d=1" control is decoupled perfectly as designed. $i_{ra\_rms}=5.9$ A and $i_{ra\_peak}=13.7$ A. Compared to the results shown in FIG. 12A, the transformer current has much small rms. and peak values since the double—frequency ripple current propagation path has been blocked. Compared to the results shown in FIG. 11, those two $i_{ra\_rms}$ values are very close. The $i_{ra\_peak}$ value is about 20% bigger with the proposed method. The dc bus capacitance reduction is up to (3.18−0.18)/3.18=94.3% with the proposed method.

Figure 13B:
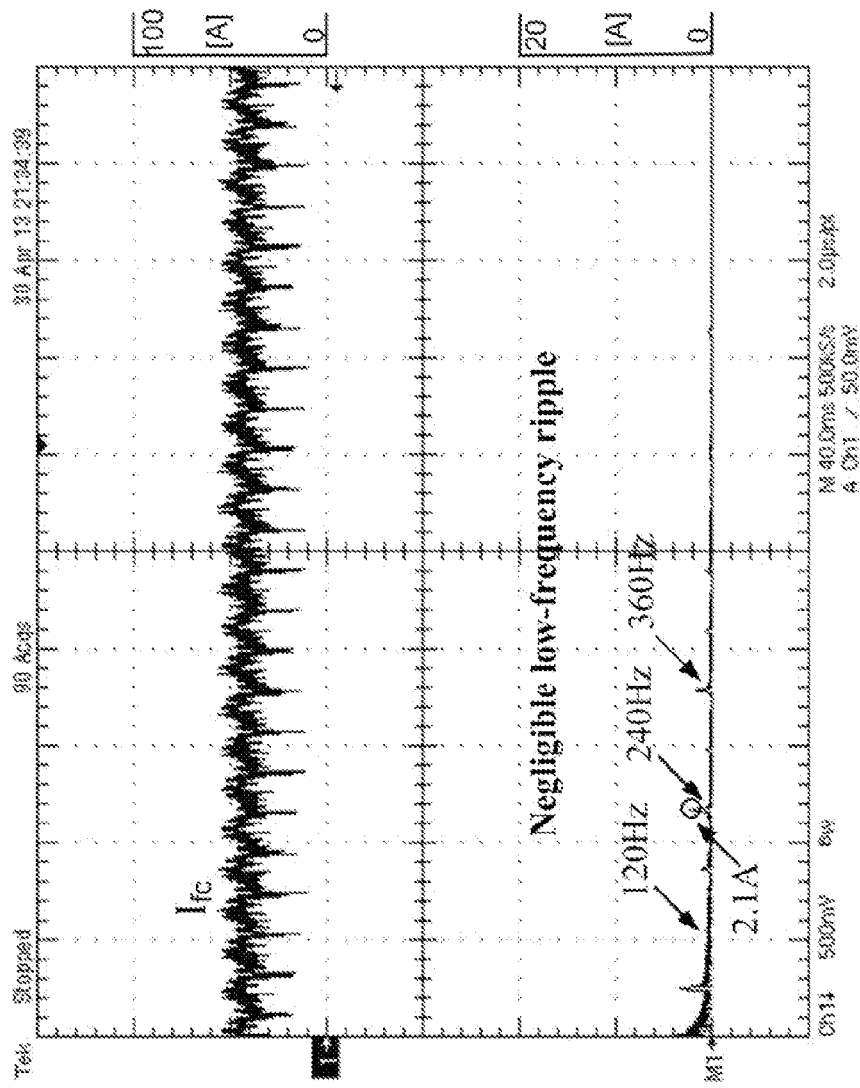
FIG. 13B is a graphical representation of experimental results with proposed control method, Cp=220 μF, Cs=180 μF illustrating $I_{fc}$ FFT analysis result in accordance with an embodiment of the invention.

FIG. 13B shows the FFT analysis result of $I_{fc}$ in FIG. 13A. As illustrated, the 120 Hz component is almost zero which further validates the performance of proposed direct double-frequency ripple current control. The largest low-frequency ripple component is 240 Hz and the value is 2.1 A which is only 2.1/41=5.1% of the dc component.

Figure 14A:
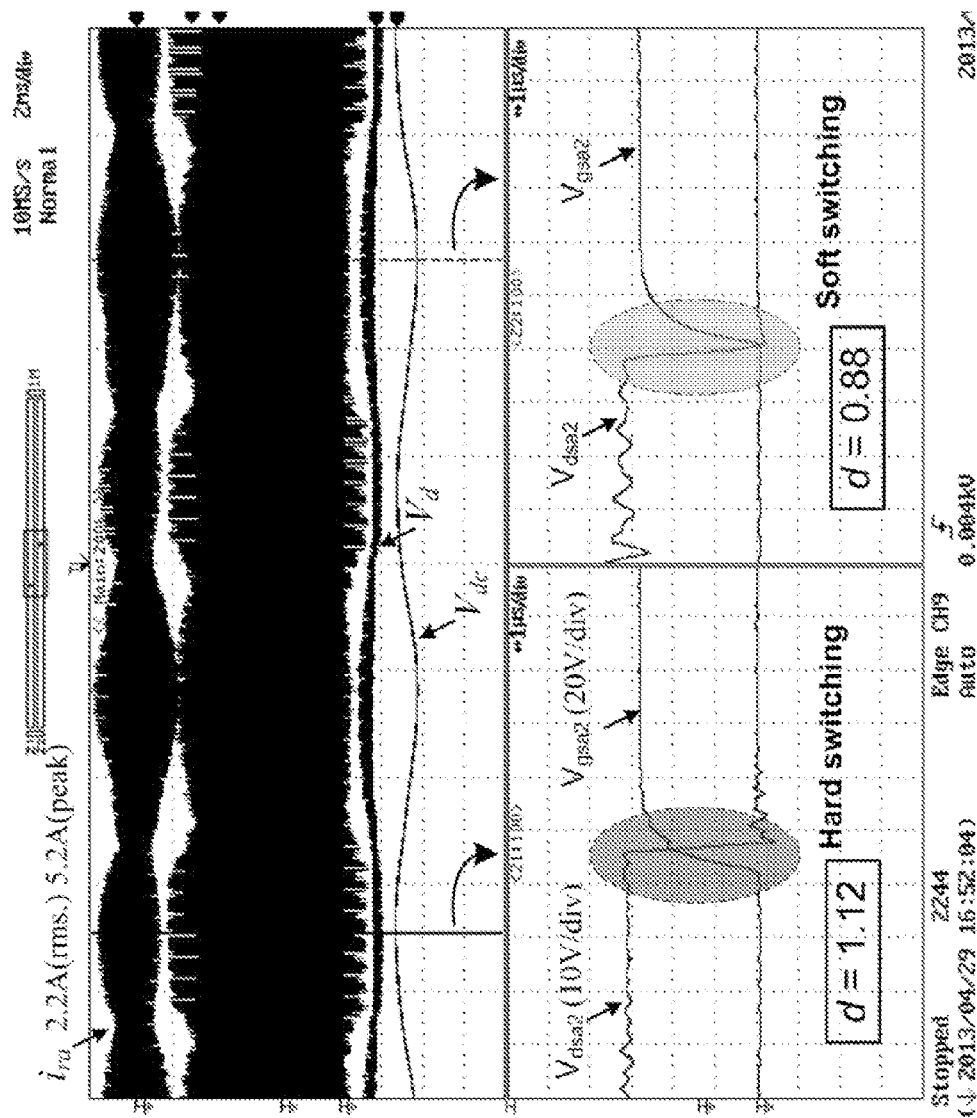
FIG. 14A is a graphical representation of experimental results with switch $S_{a2}$ switching waveforms, fixed D=0.5 control, in accordance with an embodiment of the invention.
Figure 14B:
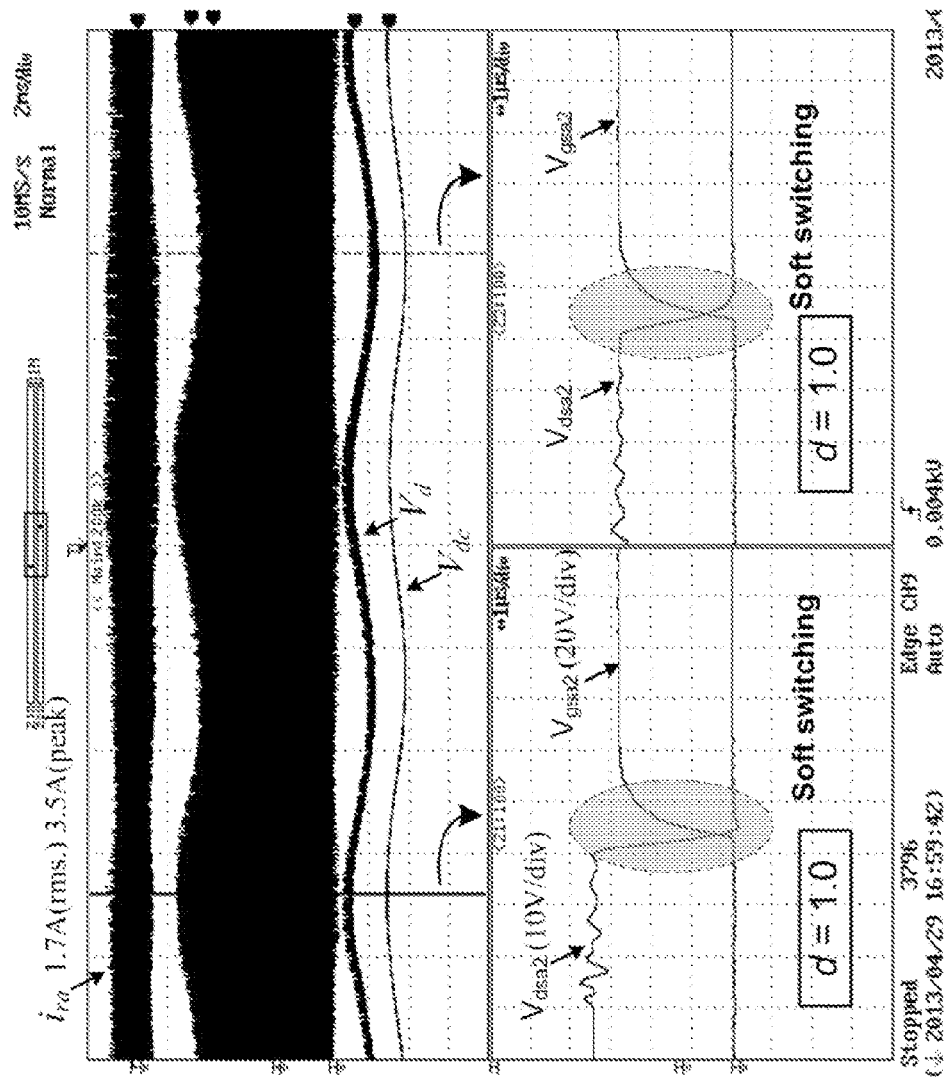
FIG. 14B is a graphical representation of experimental results with 2witch $S_{a2}$ switching waveforms, "d=1" varied duty cycle control, in accordance with an embodiment of the invention.

FIG. 14 illustrates the phase A LVS lower switch $S_{a2}$ switching waveforms with fixed D=0.5 control and "d=1" varied duty cycle control. The LVS lower switch switching waveforms are selected since their ZVS conditions are more critical compared to the LVS upper switches and HVS switches. This is caused by the effect of dc inductor current. For the test case shown in FIG. 14, $\phi=0.028\pi$ and $L_{dc1}/L_{s1}=13.3$. Therefore, by calculation based on the ZVS conditions given in (A-2), the ZVS operation of $S_{a2}$ requires d<1.07. FIG. 14A shows $S_{a2}$ switching waveforms with fixed D=0.5 control. $V_d$ is constant due to fixed D and $V_{dc}$ has the 120 Hz ripple due to the small dc bus capacitance. As illustrated, two cases switching waveforms with maximum $V_{dc}$ and minimum $V_{dc}$ are highlighted. $S_{a2}$ was hard-switching with d=1.12 at maximum $V_{dc}$ and was soft-switching with d=0.88 at minimum $V_{dc}$. This result validated the ZVS conditions analysis. FIG. 14B shows $S_{a2}$ switching waveforms with "d=1" varied duty cycle control. As shown, $V_d$ was controlled to be synchronized with primary-referred $V_{dc}$ for maintaining d=1. Two cases switching waveforms with maximum $V_{dc}$ and minimum $V_{dc}$ are also highlighted. $S_{a2}$ was soft-switching in both cases. Therefore, it proves that the "d=1" varied duty cycle control can maintain ZVS operation of LVS lower switches.

Figure 15:
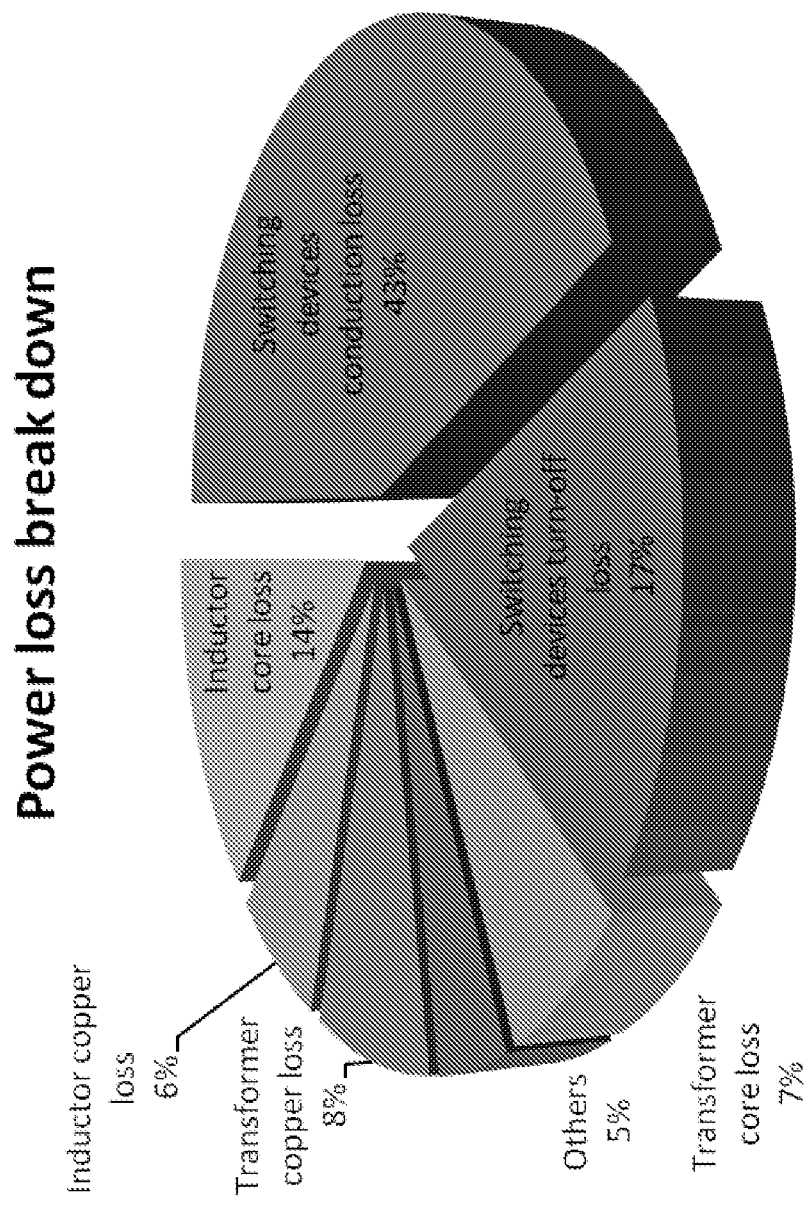
FIG. 15 is a graphical representation of the power loss break down analysis of three-phase HFL converter with rate output power in accordance with an embodiment of the invention.

FIG. 15 shows the three-phase HFL converter power loss break down analysis at rated load with assumed ZVS operation. As shown, the switching device conduction loss, turn-off loss and inductor core loss are the three main losses. By comparing the results shown in FIG. 11 and FIG. 13, the $I_{fc}$ and $i_{ra}$ rms. and peak values are very close. Therefore, compared to the traditional method with large electrolytic capacitor, the switching device rms. current and turn-off current will not be increased too much if applying the proposed method with small film capacitor. The inductor core loss is mainly determined by the inductor current high-frequency ripple which is not affected by the proposed method. In addition, the experimental results shown in FIG. 14 validated that the ZVS operation can be maintained with the proposed "d=1" varied duty cycle control. In conclusion, the proposed direct ripple current control method will not degrade the three-phase HFL converter operation efficiency.

Figure 16:
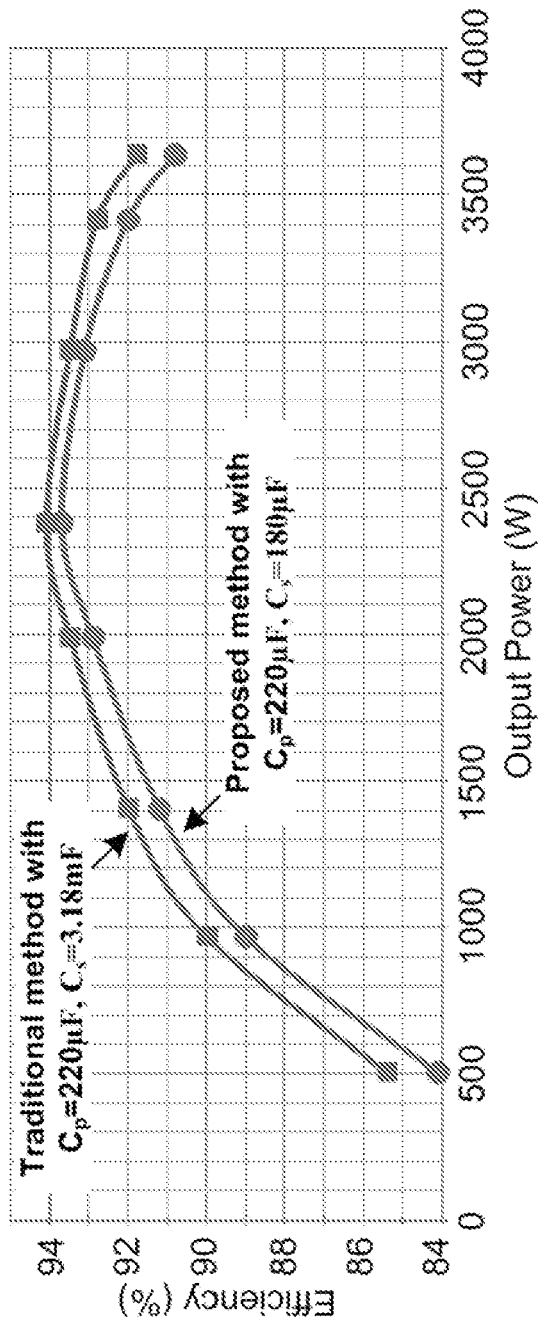
FIG. 16 is a graphical representation of an efficiency data comparison between the traditional method with large electrolytic capacitor and the proposed method with small film capacitor in accordance with an embodiment of the invention.

FIG. 16 shows the proposed fuel cell system efficiency data comparison between the traditional method with large electrolytic capacitor ($C_p=220\,\mu F$, $C_s=3.18\,mF$.) and the proposed method with small film capacitor ($C_p=220\,\mu F$, $C_s=180\,\mu F$). As shown, the system efficiency with proposed method is very close to the one with traditional method. The peak efficiency for traditional method and proposed method is 94.1% and 93.7%, respectively. The difference is only 0.4%. For rated load operation, the efficiency is decreased by 0.9%. This result is consistent with the results shown in FIG. 11 and FIG. 13 since the proposed method has about 20% larger transformer peak current.

The present invention provides a three-phase HFL based fuel cell power conditioning system that can achieve low-frequency ripple free input current using a direct double-frequency ripple current control. To directly eliminate the fuel cell current double-frequency ripple, a PR controller has been developed to achieve an extra high control gain at 120 Hz resonant frequency. The controller generates the virtual high impedance that can block the ripple energy propagation from inverter load to fuel cell stack and it also eliminates the disturbance from varied duty cycle. The presented soft-switching analysis shows that the proposed "d=1" varied duty cycle control can maintain all switching devices ZVS operation with large dc bus voltage swing. The PR controller is adopted for duty cycle control in order to achieve the "d=1" operation and eliminate the inverter load current and phase shift variation disturbances. The experimental results validate the proposed technology performance and the dc bus capacitance reduction is up to 94.3% compared to the prior art methods.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for reducing a double-frequency ripple current disturbance introduced by an inverter load coupled to a fuel cell system, the method comprising:
generating, by a first proportional-resonant controller, an output having a first double-frequency component of a phase shift angle between the active switches on a low voltage side (LVS) and a high voltage side (HVS) of a fuel cell system;
generating, by a proportional-integral controller, an output having a dc component and a second double-frequency component of the phase shift angle between the active switches on the low voltage side (LVS) and the high voltage side (HVS) of the fuel cell system; and
offsetting the first double-frequency component generated by the first proportional-resonant controller with the second double-frequency component generated by the proportional-integral controller to reduce a double-frequency ripple current disturbance introduced when an inverter load is coupled to the fuel cell system.

2. The method of claim 1, wherein generating, by a first proportional-resonant controller, an output having a first double-frequency component of a phase shift angle between active switches on a low voltage side (LVS) and a high voltage side (HVS) of the fuel cell system further comprises supplying a fuel cell current of the fuel cell system and a current ripple reference to the first proportional-resonant controller.

3. The method of claim 1, wherein generating, by a first proportional-resonant controller, an output having a first double-frequency component of a phase shift angle between active switches on a low voltage side (LVS) and a high voltage side (HVS) of the fuel cell system further comprises, setting the first proportional-resonant controller to a resonant frequency of the first proportional-resonant controller.

4. The method of claim 3, wherein the resonant frequency is 120 Hz.

5. The method of claim 1, wherein generating, by a proportional-integral controller, an output having a dc component and a second double-frequency component of the phase shift angle between the active switches on the low voltage side (LVS) and the high voltage side (HVS) of the fuel cell system further comprises supplying a high voltage side dc bus voltage of the fuel cell system and a voltage reference to the proportional-integral controller.

6. The method of claim 1, further comprising, generating, by a second proportional-resonant controller, a duty cycle having a dc component and a ripple component.

7. The method of claim 6, wherein generating, by a the second proportional-resonant controller, a duty cycle having a dc component and a ripple component further comprises, supplying a high voltage side dc bus voltage of the fuel cell system multiplied by a transformer turns ratio of the fuel cell system and a low voltage side dc bus voltage to the second proportional-resonant controller.

8. The method of claim 7, wherein the ripple component of the duty cycle is generated by synchronizing the low voltage side dc bus voltage and a primary-referred high voltage side dc bus voltage.

9. The method of claim 6, wherein the dc component of the duty cycle is set to 0.5.

10. A system for reducing a double-frequency ripple current disturbance introduced by an inverter load coupled to a fuel cell system, the system comprising:
- a first proportional-resonant controller configured for generating an output having a first double-frequency component of a phase shift angle between active switches on a low voltage side (LVS) and a high voltage side (HVS) of a fuel cell system;
- a proportional-integral controller configured for generating an output having a dc component and a second double-frequency component of the phase shift angle between the active switches on the low voltage side (LVS) and the high voltage side (HVS) of the fuel cell system; and
- circuitry for offsetting the first double-frequency component generated by the first proportional-resonant controller with the second double-frequency component generated by the proportional-integral controller to reduce a double-frequency ripple current disturbance introduced when an inverter load is coupled to the fuel cell system.

11. The system of claim 10 further comprising a fuel cell current of the fuel cell system coupled to a first input of the first proportional-resonant controller and a current ripple reference coupled to a second input of the first proportional-resonant controller.

12. The system of claim 10, wherein the first proportional-resonant controller is set to a resonant frequency of the first proportional-resonant controller.

13. The system of claim 12, wherein the resonant frequency is 120 Hz.

14. The system of claim 10, further comprising a high voltage side dc bus voltage of the fuel cell system coupled to a first input of the proportional-integral controller and a voltage reference coupled to a second input of the proportional-integral controller.

15. The system of claim 10, further comprising a second proportional-resonant controller configured for generating a duty cycle having a dc component and a ripple component.

16. The system of claim 15, further comprising a high voltage side dc bus voltage of the fuel cell system multiplied by a transformer turns ratio of the fuel cell system coupled to a first input of the second proportional-resonant controller and a low voltage side dc bus voltage coupled to a second input of the second proportional-resonant controller.

17. The method of claim 16, wherein the second proportional-resonant controller is further configured for generating the ripple component of the duty cycle by synchronizing the low voltage side dc bus voltage and a primary-referred high voltage side dc bus voltage.

18. The system of claim 15, wherein the dc component of the duty cycle is set to 0.5.

19. A system for reducing a double-frequency ripple current disturbance introduced by an inverter load coupled to a fuel cell system, the system comprising:
- a first proportional-resonant controller configured for generating an output having a first double-frequency component of a phase shift angle between active switches on a low voltage side (LVS) and a high voltage side (HVS) of a fuel cell system;
- a proportional-integral controller configured for generating an output having a dc component and a second double-frequency component of the phase shift angle between the active switches on the low voltage side (LVS) and the high voltage side (HVS) of the fuel cell system;
- a second proportional-resonant controller configured for generating a duty cycle having a dc component and a ripple component; and
- circuitry for offsetting the first double-frequency component generated by the first proportional-resonant controller with the second double-frequency component generated by the proportional-integral controller to reduce a double-frequency ripple current disturbance introduced when an inverter load is coupled to the fuel cell system.

20. The system of claim 19, wherein a frequency of the first proportional-resonant controller is set to a resonant frequency of 120 Hz.

* * * * *